US012726945B2

(12) United States Patent
Shi

(10) Patent No.: US 12,726,945 B2
(45) Date of Patent: Sep. 1, 2026

(54) PAGING INDICATION METHOD AND APPARATUS, AND USER EQUIPMENT, ACCESS NETWORK DEVICE AND STORAGE MEDIUM

(71) Applicant: Beijing Xiaomi Mobile Software Co., Ltd., Beijing (CN)

(72) Inventor: Rao Shi, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 162 days.

(21) Appl. No.: 18/565,341

(22) PCT Filed: Jun. 2, 2021

(86) PCT No.: PCT/CN2021/098004
§ 371 (c)(1),
(2) Date: Nov. 29, 2023

(87) PCT Pub. No.: WO2022/252161
PCT Pub. Date: Dec. 8, 2022

(65) Prior Publication Data

US 2024/0267885 A1 Aug. 8, 2024

(51) Int. Cl.
*H04W 68/02* (2009.01)
*H04W 72/232* (2023.01)
(Continued)

(52) U.S. Cl.
CPC ......... *H04W 68/02* (2013.01); *H04W 72/232* (2023.01); *H04W 76/20* (2018.02); *H04W 76/30* (2018.02)

(58) Field of Classification Search
CPC ... H04W 68/02; H04W 68/005; H04W 68/06; H04W 68/00
See application file for complete search history.

(56) References Cited

U.S. PATENT DOCUMENTS

2023/0015708 A1* 1/2023 Gurumoorthy ..... H04W 68/025
2024/0137908 A1* 4/2024 Agiwal ................. H04W 68/02

FOREIGN PATENT DOCUMENTS

CN 101013947 A 8/2007
CN 101946548 A 1/2011
(Continued)

OTHER PUBLICATIONS

Mediatek "3GPP TSG-RAN WG2 Meeting #114 electronic Online, May 19-May 27, 2021" (Year: 2021).*
(Continued)

*Primary Examiner* — Lester G Kincaid
(74) *Attorney, Agent, or Firm* — Oblon, McClelland, Maier & Neustadt, L.L.P.

(57) ABSTRACT

The present disclosure belongs to the technical field of communications. Provided are a paging indication method and apparatus, and a user equipment (UE), an access network device and a storage medium. The method includes: a UE acquiring paging group configuration information which is indicated by an access network device, wherein the paging group configuration information includes a default paging subgroup serial number ID, and the default paging subgroup ID is an ID of any paging group from among paging groups that correspond to the access network device.

18 Claims, 19 Drawing Sheets

(51) Int. Cl.
*H04W 76/20* (2018.01)
*H04W 76/30* (2018.01)

(56) References Cited

FOREIGN PATENT DOCUMENTS

| | | | |
|---|---|---|---|
| CN | 103124399 | A | 5/2013 |
| CN | 109600831 | A | 4/2019 |
| WO | 109286966 | A | 1/2019 |
| WO | WO 2019/007054 | A1 | 1/2019 |
| WO | WO 2020/061933 | A1 | 4/2020 |
| WO | WO 2021/018531 | A1 | 2/2021 |

OTHER PUBLICATIONS

International Search Report issued Feb. 24, 2022 in PCT/CN2021/098004, filed on Jun. 2, 2021, 6 pages (with English Translation).
"Discussion on idle/inactive-mode UE power saving", Xiaomi Communications, (R2-2105295), 3GPP TSG-RAN WG2 Meeting #114, 2021, 6 pages.
"UE subgrouping for paging enhancement", Vivo, (R2-2104909), 3GPP TSG-RAN WG2 Meeting #114-e, 2021, 6 pages.
3rd Generation Partnership Project; Technical Specification Group Radio Access Network; NR; User Equipment (UE) procedures in Idle mode and RRC Inactive state (Release 17), 3GPP TS 38.304 V17.6.0 (Sep. 2023), 51 pages.
Combined Chinese Office Action and Search Report issued Jun. 12, 2025, in corresponding Chinese Patent Application No. 202180001767.4 (with English Translation) citing documents 1-3 therein, 15 pages.
Combined Chinese Notice of Allowance and Search Report issued Apr. 1, 2026, in corresponding Chinese Patent Application No. 202180001767.4 (with English Translation and English Translation of Category of Cited Documents) citing documents 9-11 therein, 6 pages.
RAN2 Chairman (MediaTek), "Draft Chairman Notes", 3GPP TSG-RAN WG2 Meeting #114 electronic, Online, May 17-27, 2021, R2-2xxxxxx, pp. 1-126.
Vice-Chairman (CMCC), "Report from session on Rel-14 and Rel-15 LTE and NR idle/inactive mobility", 3GPP TSG-RAN WG2 #103, Gothenburg, Sweden, Aug. 20-24, 2018, R2-1812925, pp. 1-23.
Li Xiang et al., "TBSP: A Two-Phase Bluetooth Scatternet Formation Algorithm", Journal of Computer Research and Development, 43 (2). 2006. pp. 211-217.
Vivo, "Discussion on paging grouping", 3GPP TSG RAN WG1#103-e, e-Meeting, Oct. 26-Nov. 13, 2020. R1-2007675, 9 pages.
Moderator (Samsung), "Summary for TRS/CSI-RS occasion(s) for idle/inactive UEs". 3GPP TSG RAN WG1 #104b-e, e-Meeting, Apr. 12-Apr. 20, 2021, R1-2104115, pp. 1-70.
Qualcomm Incorporated, "PEI configurations and monitoring procedures", 3GPP Tsg-Ran WG2 Meeting #116-e, Online, Nov. 1 - 12, 2021, R2-2109453, pp. 1-3.

* cited by examiner

Obtaining the paging group configuration information indicated by the access network device

101

Sending a Paging DCI to UE, where the Paging DCI can include a first indicator code, and the first indicator code indicates whether the paging subgroup corresponding to the default paging subgroup ID needs to receive the Paging DCI

Sending a PEI to the UE, where the PEI can include a second indicator code, and the second indicator code indicates whether the paging subgroup corresponding to the default paging subgroup ID needs to receive the PEI

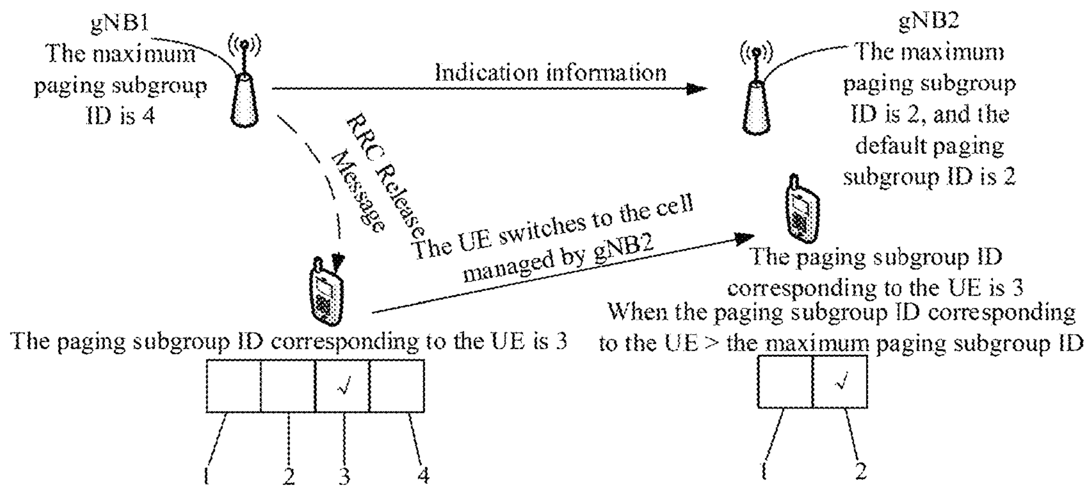

Fig. 17b

PAGING INDICATION METHOD AND APPARATUS, AND USER EQUIPMENT, ACCESS NETWORK DEVICE AND STORAGE MEDIUM

CROSS-REFERENCE TO RELATED APPLICATIONS

The present application is a U.S. National Stage of International Application No. PCT/CN2021/098004, filed on Jun. 2, 2021, the content of which is incorporated by reference herein in its entireties for all purposes.

BACKGROUND

Technical Field

The present disclosure relates to the field of communication technology and, in particular, to a paging indication method, an apparatus, a user equipment, an access network device, and a storage medium.

Description of the Related Art

In the NR (New Radio) system, a paging grouping mechanism has been introduced, in which the base station divides all UEs (User Equipment) in the same PO (Paging Occasion) into several subgroups and assigns subgroup IDs (Identity documents) to the UEs, so that the UEs only listen to their corresponding subgroups based on the assigned subgroup IDs, thereby avoiding unnecessary paging listening.

SUMMARY

According to an aspect of the present disclosure, there is provided a paging indication method, performed by user equipment UE, including: obtaining paging group configuration information indicated by an access network device, where the paging group configuration information includes a default paging subgroup serial number ID, and the default paging subgroup ID is an ID of any of paging groups corresponding to the access network device.

According to another aspect of the present disclosure, there is provided a paging indication method, performed by an access network device, including indicating paging group configuration information of the access network device to a UE, where the paging group configuration information includes a default paging subgroup ID, and the default paging subgroup ID is an ID of any of paging groups corresponding to the access network device.

According to another aspect of the present disclosure, there is provided a paging indication device, including an obtaining module configured to obtain paging group configuration information indicated by an access network device, where the paging group configuration information includes a default paging subgroup serial number ID, and the default paging subgroup ID is an ID of any of paging groups corresponding to the access network device.

According to another aspect of the present disclosure, there is provided a paging indication device, including an indicating module configured to indicate paging group configuration information of an access network device to a UE, where the paging group configuration information comprises a default paging subgroup ID, and the default paging subgroup ID is an ID of any of paging groups corresponding to the access network device.

According to another aspect of the present disclosure, there is provided a user equipment, including a transceiver, a memory, and a processor, respectively connected to the transceiver and the memory, configured to control wireless signal transmission and reception of the transceiver by executing non-transitory computer executable instructions on the memory, and capable of implementing any of the methods as described above.

According to another aspect of the present disclosure, there is provided an access network device, including a transceiver, a memory, and a processor, respectively connected to the transceiver and the memory, configured to control wireless signal transmission and reception of the transceiver by executing non-transitory computer executable instructions on the memory, and capable of implementing any of the methods as described above.

According to another aspect of the present disclosure, there is provided a computer storage medium, where the computer storage medium stores non-transitory computer executable instructions, and, after the computer executable instructions are executed by the processor, the method as described above is implemented.

The additional aspects and advantages of the present disclosure will be partially provided in the following description, and some will become apparent from the following description or learned through the practice of the present disclosure.

BRIEF DESCRIPTION OF THE DRAWINGS

The above and/or additional aspects and advantages of this disclosure will become apparent and easy to understand from the description of embodiments in conjunction with the accompanying drawings, where:

FIG. 11 is a flowchart of a paging indication method provided by another embodiment of the present disclosure;

FIG. 12 is a flowchart of a paging indication method provided by another embodiment of the present disclosure;

FIG. 13 is a flowchart of a method for sending a paging message to UE based on the paging subgroup ID corresponding to UE provided by an embodiment of the present disclosure;

FIG. 16 is a flowchart of a method for sending a paging message to UE based on a default paging subgroup ID provided by an embodiment of the present disclosure;

FIG. 17*a* is a flowchart of another method for sending a paging message to UE based on a default paging subgroup ID provided by an embodiment of the present disclosure;

FIG. 17*b* is a flowchart illustrating the interaction between the original access network device and the target access network device in a RAN paging scenario provided by an embodiment of the present disclosure;

DETAILED DESCRIPTION OF THE PREFERRED EMBODIMENTS

Figures 1, 2:
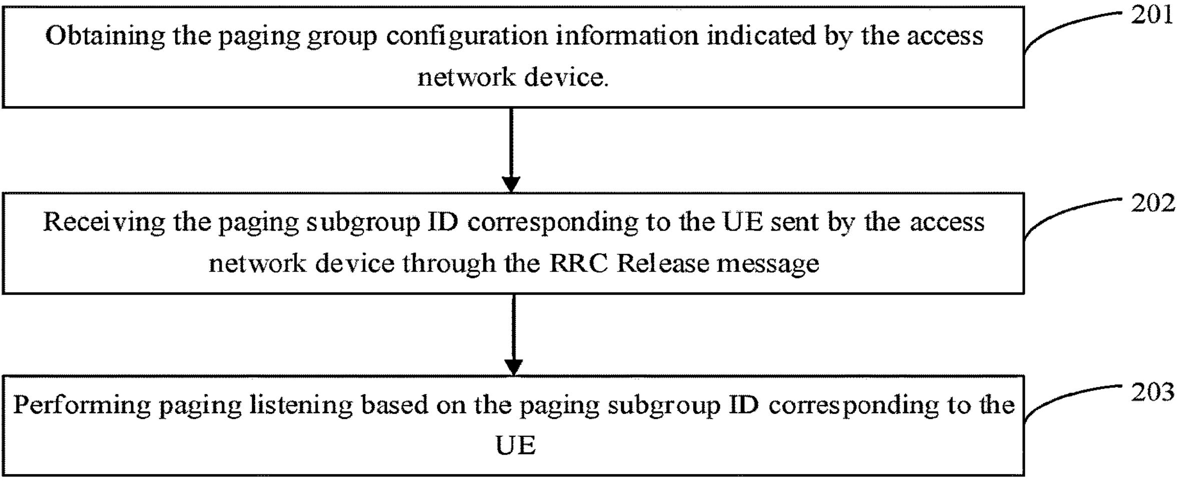
FIG. 1 is a flowchart of the paging indication method provided by an embodiment of the present disclosure.
FIG. 2 is a flowchart of a paging indication method provided by another embodiment of the present disclosure.

Here, a detailed explanation will be given of exemplary embodiments, which are illustrated in the accompanying drawings. When the following description refers to the accompanying drawings, unless otherwise indicated, the same reference numbers in different drawings represent the same or similar elements. The embodiments described in the following exemplary embodiments do not represent all embodiments that are consistent with the embodiments of the present disclosure. On the contrary, they are only examples of devices and methods that are consistent with some aspects of the embodiments of the present disclosure as detailed in the claims which follows.

The terms used in the embodiments of the present disclosure are solely for the purpose of describing specific embodiments, and are not intended to limit the embodiments of the present disclosure. The singular forms of "a", "an" and "the" used in the embodiments of the present disclosure and the accompanying claims are also intended to include the majority form, unless the context clearly indicates other meanings. It should also be understood that the term "and/or" used herein refers to and includes any or all possible combinations of one or more related listed items.

It should be understood that although the terms first, second, third, etc. may be used to describe various information in the embodiments of the present disclosure, such information should not be limited to these terms. These terms are only used to distinguish the same type of information from each other. For example, without departing from the scope of the embodiments of the present disclosure, the first information can also be referred to as the second information, and similarly, the second information can also be referred to as the first information. Depending on the context, the word "if" used herein can be interpreted as "when", or "in response to determining . . . ".

The following is a detailed description of the embodiments of the present disclosure. The examples of the embodiments are shown in the accompanying drawings, where the same or similar reference numbers represent the same or similar elements throughout. The embodiments described below with reference to the accompanying drawings are exemplary and intended to explain the present disclosure, but cannot be understood as limiting the disclosure.

In related art, the grouping strategies of different base stations may vary. In this case, when a UE undergoes cell reselection, the subgroup ID assigned to the UE by the previous cell may not be included in the subgroup ID corresponding to the target cell. For example, the subgroup ID assigned to the UE by the previous cell is 4, while the subgroup ID corresponding to the target cell only includes 1 and 2. This will make it impossible for the subgroup ID assigned to UE by the previous cell to be adapted to the target cell, thus preventing normal paging listening.

In the paging indication method provided by the embodiment of the present disclosure, UE can obtain the paging group configuration information indicated by the access network device. The paging group configuration information includes the default paging subgroup ID and the maximum paging subgroup ID. Next, UE can perform paging listening based on the default paging subgroup ID and the maximum paging subgroup ID. Specifically, when the corresponding paging subgroup ID of UE is greater than the maximum paging subgroup ID, then UE performs paging listening based on the default paging subgroup ID; otherwise UE performs paging listening based on the corresponding paging subgroup ID of UE. That is to say, in the embodiment of the present disclosure, when the UE switches to the target cell, the UE can determine the paging subgroup for paging listening based on the default paging subgroup ID and maximum paging subgroup ID corresponding to the target access network device managing the target cell, and can perform paging listening based on the determined paging subgroup. Therefore, the paging indication method provided by the embodiment of the present disclosure can ensure that UE can perform paging listening normally when cell reselection occurs, enabling UE to achieve paging listening matching with different access network devices.

The following is a detailed description of the paging indication method, apparatus, user equipment, access network device, and storage medium provided in this disclosure, with reference to the accompanying drawings.

FIG. 1 is a flowchart of a paging indication method provided by the embodiment of the present disclosure, applied to UE. As shown in FIG. 1, the paging indication method can include the following steps.

Step 101: obtaining the paging group configuration information indicated by the access network device. The paging group configuration information can include the default paging subgroup ID, where the default paging subgroup ID can be the ID of any of the paging groups corresponding to the access network device.

It should be noted that the paging indication method of the embodiment of the present disclosure can be applied to any UE. UE can be a device that provides voice and/or data connectivity to users. UE can communicate with one or more core networks through the Radio Access Network (RAN). UE can be an IoT terminal, such as a sensor device, a mobile phone (or a "cellular" phone), and a computer with an IoT terminal, such as fixed, portable, pocket, handheld, computer built-in, or on-board devices. For example, a station (STA), a subscriber unit, a subscriber station, a mobile station, a mobile, a remote station, an access point, a remote terminal, an access terminal, a user terminal, or a user agents. Alternatively, UE can also be a device for unmanned aerial vehicle. Alternatively, UE can also be an on-board device, such as a trip computer with wireless communication function or a wireless terminal externally connected to a trip computer. Alternatively, UE can also be a roadside device, such as a street light, signal light, or other roadside device, etc. with wireless communication function.

In an embodiment of the present disclosure, the access network device may include a base station.

In an embodiment of the present disclosure, the method of obtaining paging group configuration information indicated by the access network device may include receiving the paging group configuration information sent by the access network device through a system message. As an example, in an embodiment of the present disclosure, the access network device can add the paging group configuration information to PCCH-Config (Paging Control Channel Configuration) of SIB1 (System Information Block), thereby sending the paging group configuration information through the system message.

In another embodiment of the present disclosure, the method of obtaining paging group configuration information indicated by the access network device may include: obtaining, by UE, the paging group configuration information indicated by the access network device based on a protocol provision. As an example, in an embodiment of the present disclosure, the paging group configuration information of the access network device can be agreed based on the TS38.304 protocol.

Furthermore, in an embodiment of the present disclosure, the paging group configuration information may also include the maximum paging subgroup ID corresponding to the access network device, so that the UE can perform paging listening based on the maximum paging subgroup ID and the default paging subgroup ID subsequently.

In another embodiment of the present disclosure, the default paging subgroup ID can be the maximum paging subgroup ID.

In summary, in the paging indication method provided by the embodiment of the present disclosure, UE can obtain the paging group configuration information indicated by the access network device. The paging group configuration information includes the default paging subgroup ID and the maximum paging subgroup ID. Next, UE can perform paging listening based on the default paging subgroup ID and the maximum paging subgroup ID. Specifically, when the paging subgroup ID corresponding to the UE is greater than the maximum paging subgroup ID, then the UE performs paging listening based on the default paging subgroup ID; otherwise the UE performs paging listening based on the paging subgroup ID corresponding to the UE. That is to say, in the embodiment of the present disclosure, when the UE switches to the target cell, the UE can determine the paging subgroup for paging listening based on the default paging subgroup ID and the maximum paging subgroup ID corresponding to the target access network device managing the target cell, and can perform paging listening based on the determined paging subgroup. Therefore, the paging indication method provided by the embodiment of the present disclosure can ensure that the UE can perform paging listening normally when cell reselection occurs, enabling the UE to achieve paging listening matching with different access network devices.

FIG. 2 is a flowchart of a paging indication method provided by another embodiment of the present disclosure, applied to UE. As shown in FIG. 2, the paging indication method may include the following steps:

Step 201: obtaining the paging group configuration information indicated by the access network device. The paging group configuration information can include the default paging subgroup ID, where the default paging subgroup ID can be the ID of any of the paging groups corresponding to the access network device.

For a detailed description on obtaining paging group configuration information indicated by access network devices, please refer to the description in the embodiment mentioned above, and the details are not repeated here.

Step 202: receiving the paging subgroup ID corresponding to the UE sent by the access network device through the RRC (Radio Resource Control) Release message.

In an embodiment of the present disclosure, the access network device can group UEs under the same PO, assign paging subgroup IDs to the grouped UEs, and send the paging subgroup IDs corresponding to the UEs through RRC Release messages, so that the UEs can perform paging listening based on the paging subgroup IDs corresponding to UEs subsequently.

Step 203: performing paging listening based on the paging subgroup ID corresponding to the UE.

It should be noted that in an embodiment of the present disclosure, the paging listening based on the paging subgroup ID corresponding to the UE in this step is applied to the scenario of "UE performing paging listening within the cell managed by the access network device referred to in steps 201 and 202". That is to say, when the UE performs paging listening within a cell managed by the access network device that assigns a paging subgroup ID to the UE, it can directly perform paging listening based on the paging subgroup ID corresponding to the UE.

For example, in an embodiment of the present disclosure, if base station 1 assigns a paging subgroup ID to the UE, then when the UE performs paging listening in the cell managed by base station 1, it can directly perform paging listening based on the paging subgroup ID corresponding to the UE.

Figure 3:
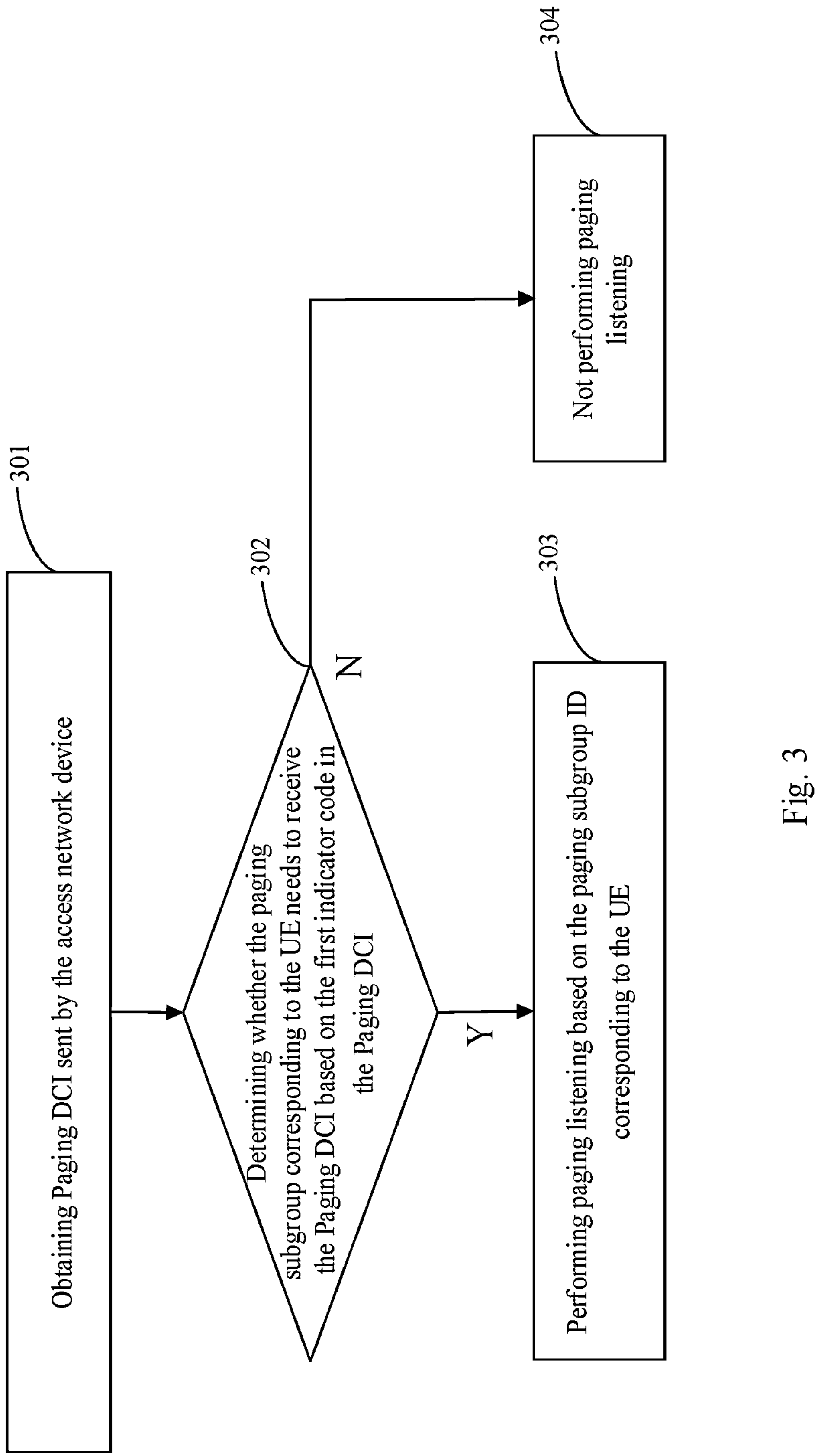
FIG. 3 is a flowchart of a paging listening method based on the corresponding paging subgroup ID of UE provided by an embodiment of the present disclosure.

Furthermore, FIG. 3 is a flowchart of a paging listening method based on the paging subgroup ID corresponding to UE in step 203 provided by an embodiment of the present disclosure. As shown in FIG. 3, the paging listening method based on the paging subgroup ID corresponding to UE can include the following steps.

Step 301: obtaining Paging DCI (Paging Downlink Control Information) sent by the access network device, where the Paging DCI can include a first indicator code, and the first indicator code indicates whether each paging subgroup needs to receive the Paging DCI.

In an embodiment of the present disclosure, the number of bits of the first indicator code can be the same as the number of paging groups corresponding to the access network device, and the bits of the first indicator code correspond one-to-one with the paging subgroup IDs corresponding to the access network device. Therefore, the value of each bit in the first indicator code can be used to indicate whether the UE corresponding to respective paging subgroup IDs of the access network device needs to receive Paging DCI.

Furthermore, in an embodiment of the present disclosure, the method of indicating whether the corresponding UE needs to receive Paging DCI by the value of each bit in the first indicator code can be as follows: when the value of a certain bit is 0, it indicates that the UE corresponding to that bit does not need to receive Paging DCI, and when the value of a certain bit is 1, it indicates that the UE corresponding to that bit needs to receive Paging DCI. In another embodiment of the present disclosure, the method of indicating whether the corresponding UE needs to receive Paging DCI by the value of each bit in the first indicator code can be as follows: when the value of a certain bit is 1, it indicates that the UE corresponding to that bit does not need to receive Paging DCI, and when the value of a certain bit is 0, it indicates that the UE corresponding to that bit needs to receive Paging DCI.

For example, in an embodiment of the present disclosure, assuming that the UEs are divided into 4 paging subgroups, the first indicator code may include 4 bits, and each of the 4 bits corresponds to a paging subgroup. For example, the first bit may correspond to a paging subgroup with a paging subgroup ID of 1, the second bit may correspond to a paging subgroup with a paging subgroup ID of 2, the third bit may correspond to a paging subgroup with a paging subgroup ID of 3, and the fourth bit can correspond to a paging subgroup with a paging subgroup ID of 4. At this point, if the first indicator code is 0010, then the first indicator code indicates that the UE corresponding to the paging subgroup with the paging subgroup ID of 3 needs to receive the Paging DCI, and other UEs do not need to receive the Paging DCI; if the first indicator code is 1101, then the first indicator code indicates that the UE corresponding to the paging subgroup with the paging subgroup ID of 3 does not need to receive the Paging DCI, and all other UEs need to receive the Paging DCI.

Step 302: determining whether the paging subgroup corresponding to the UE needs to receive the Paging DCI based on the first indicator code in the Paging DCI.

In an embodiment of the present disclosure, when it is determined that the paging subgroup corresponding to the UE needs to perform paging listening, step 303 is performed; when it is determined that the paging subgroup corresponding to UE does not need to perform paging listening, step 304 is performed.

Step 303: performing paging listening based on the paging subgroup ID corresponding to the UE.

Step 304: not performing paging listening.

Figure 4:
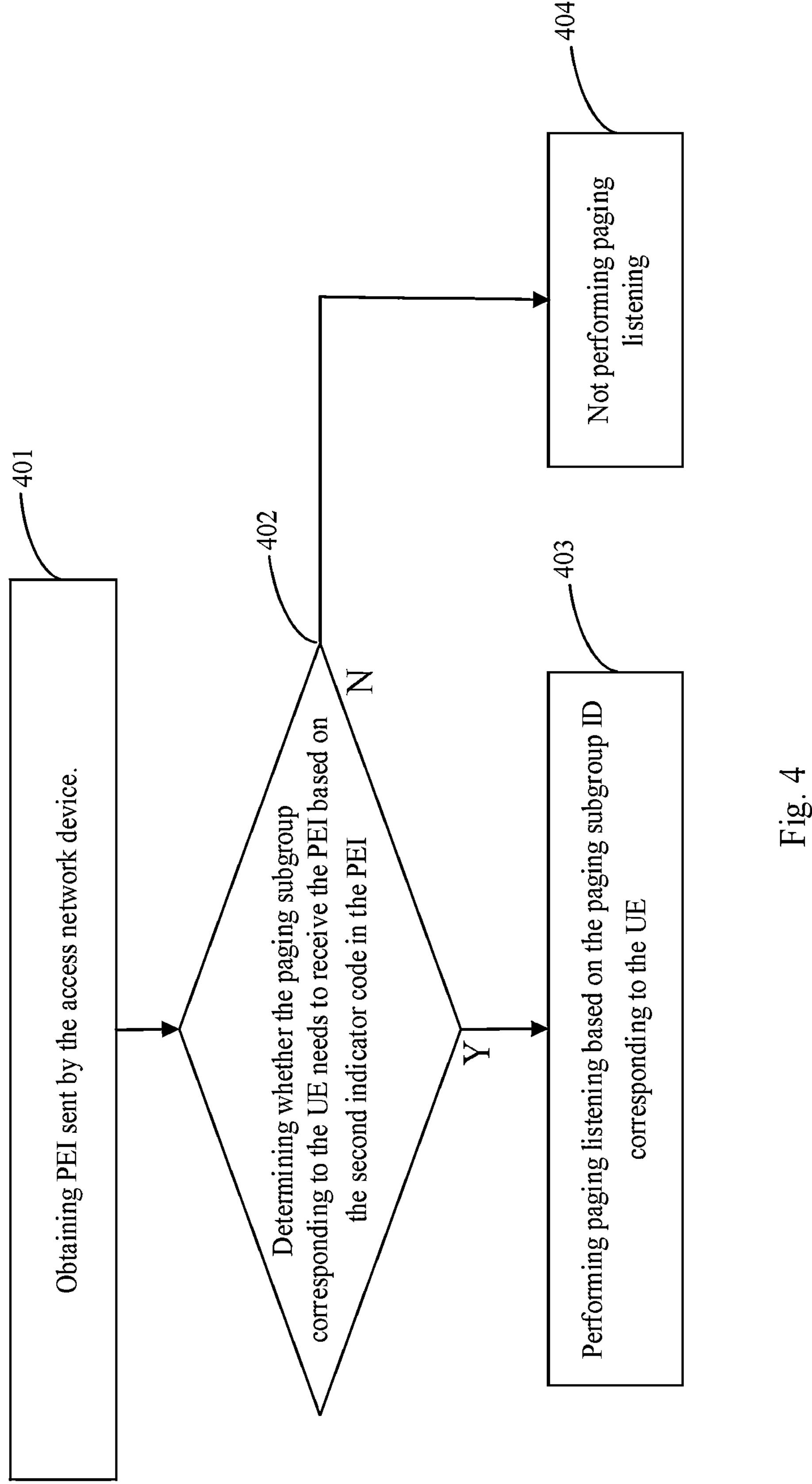
FIG. 4 is a flowchart of another paging listening method based on the corresponding paging subgroup ID of UE provided by an embodiment of the present disclosure.

Furthermore, FIG. 4 is a flowchart of another paging listening method based on the paging subgroup ID corresponding to the UE in step 203 provided by an embodiment of the present disclosure. As shown in FIG. 4, the paging listening method based on the paging subgroup ID corresponding to the UE can include the following steps.

Step 401: obtaining Paging Early Indication (PEI) sent by the access network device. The PEI can include a second indicator code, and the second indicator code indicates whether each of the paging subgroups needs to receive the PEI.

In an embodiment of the present disclosure, the number of bits of the second indicator code can be the same as the number of paging groups corresponding to the access network device, and the bits of the second indicator code correspond one-to-one with the paging subgroup IDs corresponding to the access network device. Therefore, the value of each bit in the second indicator code can indicate whether the UEs corresponding to respective paging subgroup IDs of the access network device need to receive PEI.

Furthermore, in an embodiment of the present disclosure, the method of indicating whether the corresponding UE needs to receive PEI by the value of each bit in the second indicator code can be as follows: when the value of a certain bit is 0, it indicates that the UE corresponding to that bit does not need to receive PEI, and when the value of a certain bit is 1, it indicates that the UE corresponding to that bit needs to receive PEI. In another embodiment of the present disclosure, the method of indicating whether the corresponding UE needs to receive PEI by the value of each bit in the second indicator code can be as follows: when the value of a certain bit is 1, it indicates that the UE corresponding to that bit does not need to receive PEI, and when the value of a certain bit is 0, it indicates that the UE corresponding to that bit needs to receive PEI.

For example, in an embodiment of the present disclosure, assuming UEs are divided into 4 paging subgroups, the second indicator code includes 4 bits, and each of the 4 bits corresponds to a paging subgroup. For example, the first bit can correspond to a paging subgroup with a paging subgroup ID of 1, the second bit can correspond to a paging subgroup with a paging subgroup ID of 2, the third bit can correspond to a paging subgroup with a paging subgroup ID of 3, and the fourth bit can correspond to a paging subgroup with a paging subgroup ID of 4. At this point, if the second indicator code is 0010, then the second indicator code indicates that the UE corresponding to the paging subgroup with the paging subgroup ID of 3 needs to receive the PEI, while other UEs do not need to receive the PEI; if the second indicator code is 1101, then the second indicator code indicates that the UE corresponding to the paging subgroup with the paging subgroup ID of 3 does not need to receive the PEI, and all other UEs need to receive the PEI.

Step 402: determining whether the paging subgroup corresponding to the UE needs to receive the PEI based on the second indicator code in the PEI.

In an embodiment of the present disclosure, when it is determined that the paging subgroup corresponding to the UE needs to perform paging listening, step 403 is performed; when it is determined that the paging subgroup corresponding to the UE does not need to perform paging listening, step 404 is performed.

Step 403: performing paging listening based on the paging subgroup ID corresponding to the UE.

Step 404: not performing paging listening.

In summary, in the paging indication method provided by the embodiment of the present disclosure, the UE can obtain the paging group configuration information indicated by the access network device. The paging group configuration information includes the default paging subgroup ID and the maximum paging subgroup ID. Next, the UE can perform paging listening based on the default paging subgroup ID and the maximum paging subgroup ID. Specifically, when the paging subgroup ID corresponding to the UE is greater than the maximum paging subgroup ID, then the UE performs paging listening based on the default paging subgroup ID; otherwise the UE performs paging listening based on the paging subgroup ID corresponding to the UE. That is to say, in the embodiment of the present disclosure, when the UE switches to the target cell, the UE can determine the paging subgroup for paging listening based on the default paging subgroup ID and the maximum paging subgroup ID corresponding to the target access network device managing the target cell, and can perform paging listening based on the determined paging subgroup. Therefore, the paging indication method provided by the embodiment of the present disclosure can ensure that the UE can perform paging listening normally when cell reselection occurs, enabling the UE to achieve paging listening matching with different access network devices.

Figure 5:
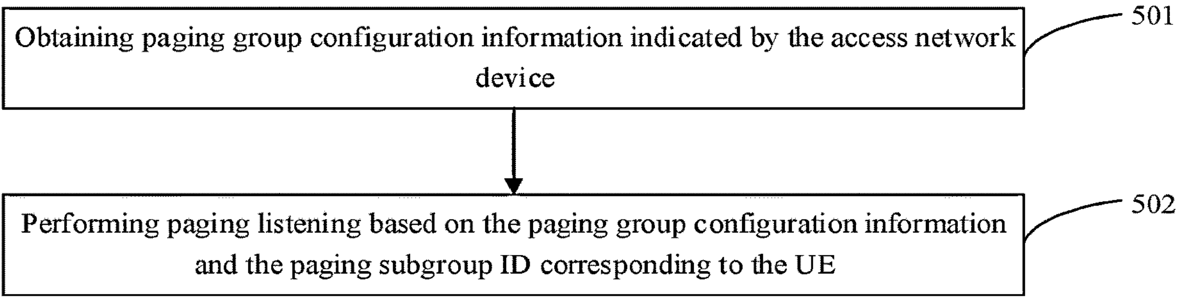
FIG. 5 is a flowchart of a paging indication method provided by another embodiment of the present disclosure.

FIG. 5 is a flowchart of a paging indication method provided by another embodiment of the present disclosure, applied to UE. As shown in FIG. 5, the paging indication method may include the following steps.

Step 501: obtaining paging group configuration information indicated by the access network device. The paging group configuration information can include the default paging subgroup ID and the maximum paging subgroup ID, where the default paging subgroup ID can be the ID of any of the paging groups corresponding to the access network device.

For a detailed description on obtaining paging group configuration information indicated by access network devices, please refer to the description in the first embodiment mentioned above, and the details are not repeated in the embodiment of the present disclosure here.

Step 502: performing paging listening based on the paging group configuration information and the paging subgroup ID corresponding to the UE.

It should be noted that in an embodiment of the present disclosure, the access network device referred to in the embodiment corresponding to FIG. 5 is different from the access network device in the embodiment of FIG. 2. Specifically, the access network device in the embodiment of FIG. 2 is the original access network device corresponding to the original cell before UE switching the cell, while the access network device in this embodiment is the target access network device corresponding to the target cell after UE switching the cell.

Figure 6:
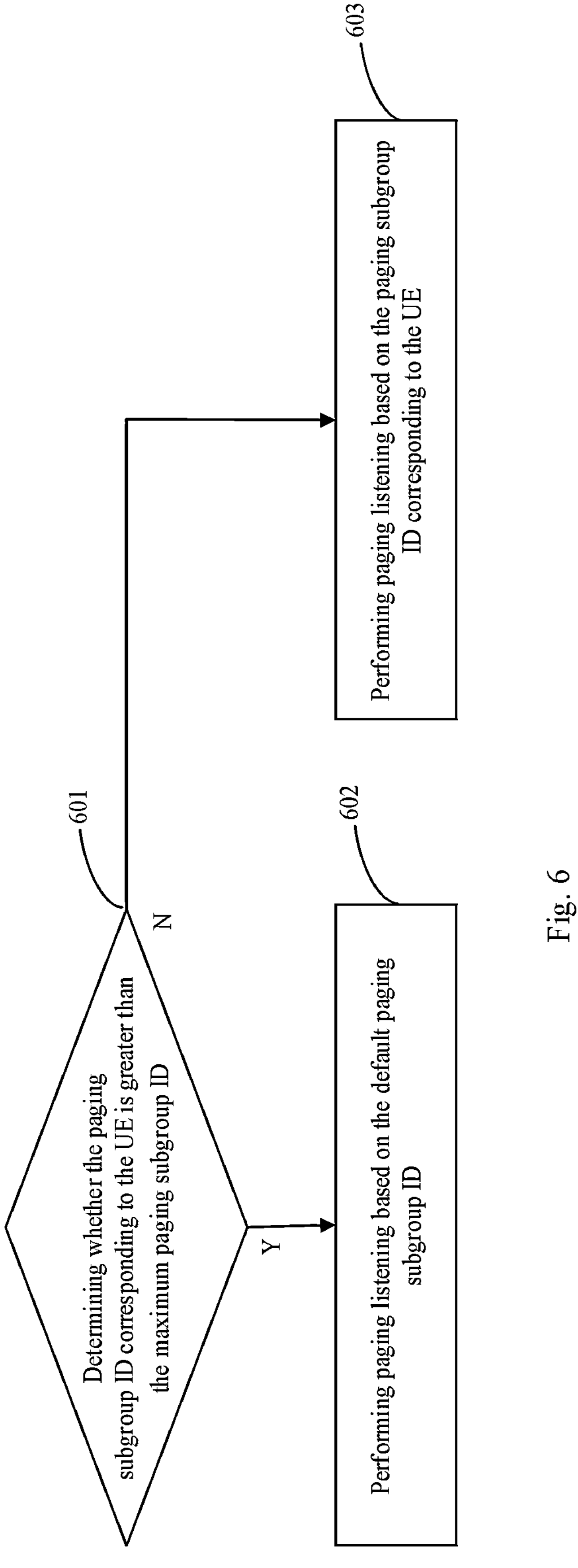
FIG. 6 is a flowchart of a paging listening method based on paging group configuration information and paging subgroup ID corresponding to UE provided by an embodiment of the present disclosure.

FIG. 6 is a flowchart of a paging listening method based on paging group configuration information and paging subgroup ID corresponding to UE in step 502 provided by an embodiment of the present disclosure. As shown in FIG. 6, the paging listening method based on the paging group configuration information and the paging subgroup ID corresponding to the UE can include the following steps.

Step 601: determining whether the paging subgroup ID corresponding to the UE is greater than the maximum paging subgroup ID.

In an embodiment of the present disclosure, by determining whether the paging subgroup ID corresponding to the UE is greater than the maximum paging subgroup ID, it is determined whether the paging subgroup ID corresponding to the UE matches the paging subgroup ID corresponding to the UE is greater than the maximum paging subgroup ID, it is considered that the paging subgroup ID corresponding to the UE is not included in the paging subgroup IDs corresponding to the target access network device, the two do not match, and step 602 is performed. When the paging subgroup ID corresponding to the UE is not greater than the maximum paging subgroup ID, it is considered that the paging subgroup ID corresponding to the UE is included in the paging subgroup IDs corresponding to the target access network device, the two match, and step 603 is performed.

Step 602: performing paging listening based on the default paging subgroup ID.

In an embodiment of the present disclosure, when it is determined that the paging subgroup ID corresponding to the UE does not match the paging subgroup IDs corresponding to the target access network device, if the UE still uses the paging subgroup ID corresponding to the UE for paging listening, normal paging listening cannot be performed. Therefore, the UE can use the preset default paging subgroup ID for paging listening, where the default paging subgroup ID is the ID of any of the paging groups corresponding to the access network device, thereby ensuring normal paging listening.

For example, in an embodiment of the present disclosure, it is assumed that the maximum paging subgroup ID corresponding to the target access network device is 2, the corresponding default paging subgroup ID is also 2, and the paging subgroup ID corresponding to the UE is 4. Due to the fact that the paging subgroup ID of 4 corresponding to UE is greater than the maximum paging subgroup ID of 2 corresponding to the target access network device, the UE can perform paging listening based on the default paging subgroup ID of 2.

Figure 7:
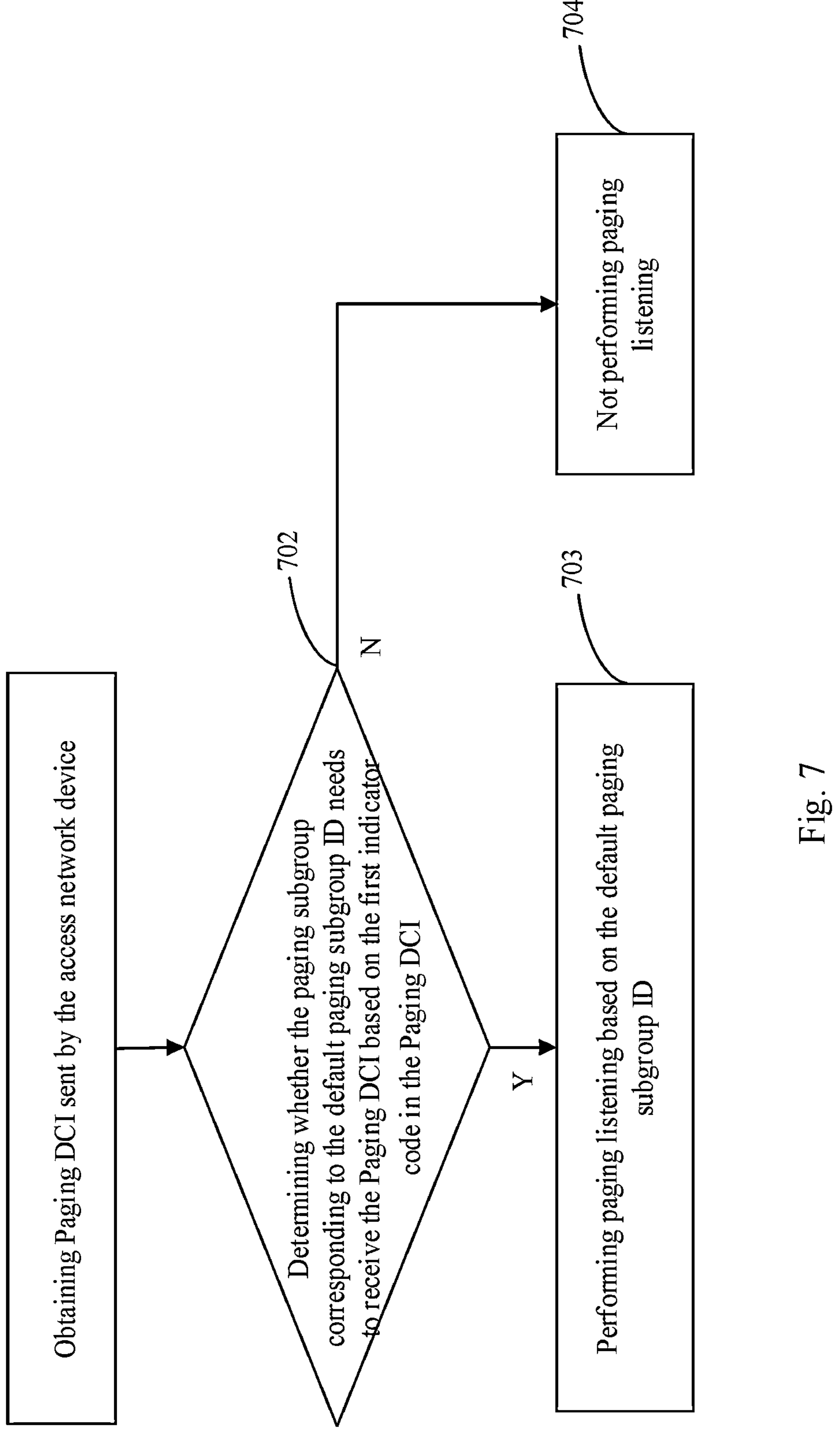
FIG. 7 is a flowchart of a paging listening method based on a default paging subgroup ID provided by an embodiment of the present disclosure.

FIG. 7 is a flowchart of a paging listening method based on a default paging subgroup ID in step 602 provided by an embodiment of the present disclosure. As shown in FIG. 7, the paging listening method based on the default paging subgroup ID can include the following steps.

Step 701: obtaining Paging DCI sent by the access network device, where the Paging DCI can include a first indicator code, and the first indicator code indicates whether each paging subgroup needs to receive the Paging DCI.

For a detailed description of the specific method for obtaining the Paging DCI sent by the access network device in step 701, please refer to the description in step 301 above, and details are not repeated in the embodiments of the present disclosure here.

Step 702: determining whether the paging subgroup corresponding to the default paging subgroup ID needs to receive the Paging DCI based on the first indicator code in the Paging DCI.

In an embodiment of the present disclosure, when it is determined that the default paging subgroup ID needs to perform paging listening, step 703 is performed; when it is determined that the default paging subgroup ID does not need to perform paging listening, step 704 is performed.

Step 703: performing paging listening based on the default paging subgroup ID.

Step 704: not performing paging listening.

Figure 8:
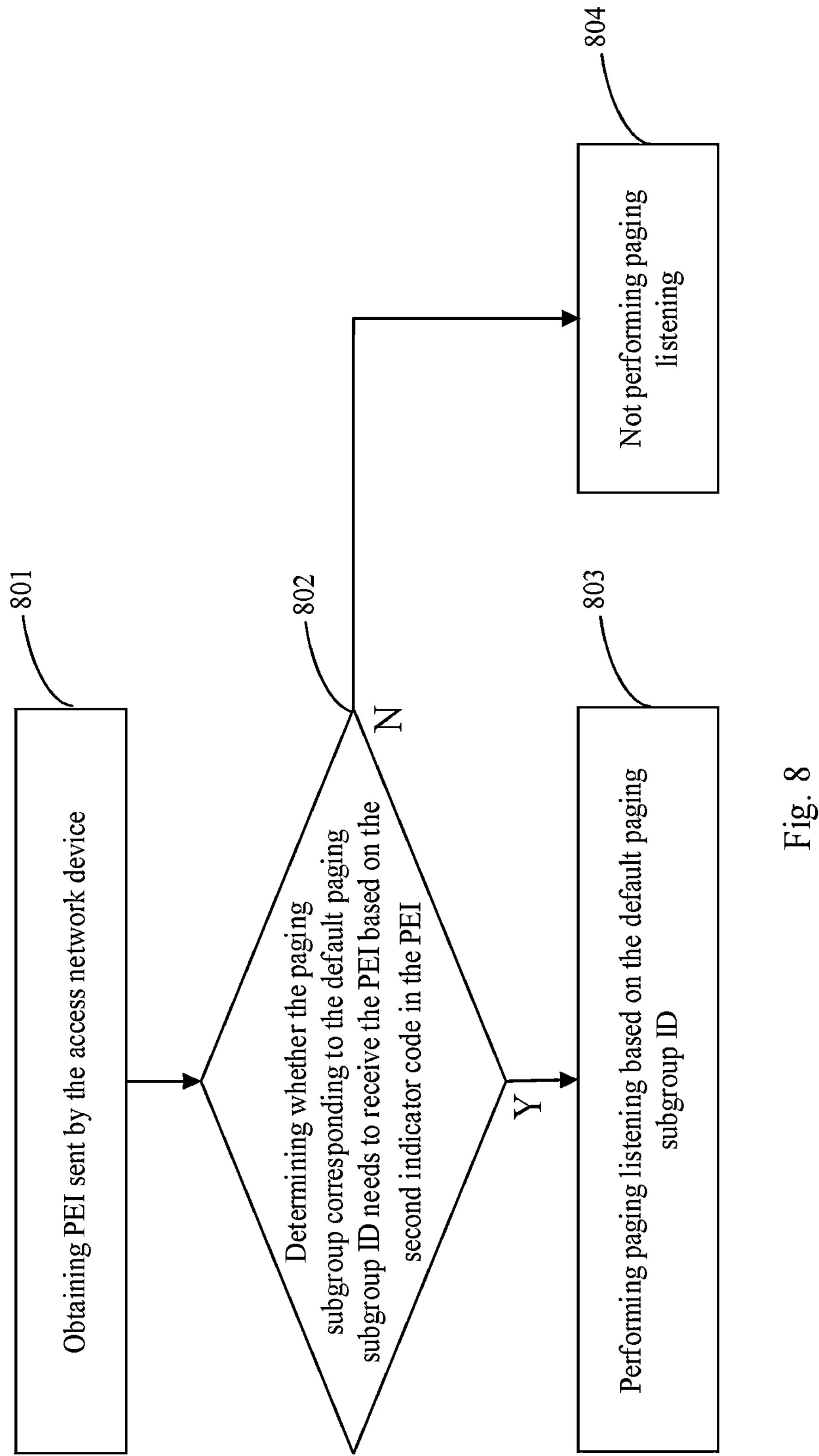
FIG. 8 is a flowchart of another paging listening method based on the default paging subgroup ID provided by an embodiment of the present disclosure.

Also, FIG. 8 is a flowchart of another paging listening method based on the default paging subgroup ID in step 602 provided by an embodiment of the present disclosure. As shown in FIG. 8, the paging listening method based on the default paging subgroup ID can include the following steps.

Step 801: obtaining PEI sent by the access network device. The PEI can include a second indicator code, and the second indicator code indicates whether each of the paging subgroups needs to receive the PEI.

For a detailed description of the specific method for obtaining the PEI sent by the access network device in step 801, please refer to the description in step 401 above, and the details are not repeated in the embodiments of the present disclosure here.

Step 802: determining whether the paging subgroup corresponding to the default paging subgroup ID needs to receive the PEI based on the second indicator code in the PEI.

In an embodiment of the present disclosure, when it is determined that the default paging subgroup ID needs to perform paging listening, step 803 is performed; when it is determined that the default paging subgroup ID does not need to perform paging listening, step 804 is performed.

Step 803: performing paging listening based on the default paging subgroup ID.

Step 804: not performing paging listening.

Step 603: performing paging listening based on the paging subgroup ID corresponding to the UE.

In an embodiment of the present disclosure, when it is determined in step 602 that the paging subgroup ID corresponding to the UE matches the paging subgroup ID corresponding to the target access network device, the paging subgroup ID corresponding to the UE can be directly used for paging listening.

For example, in an embodiment of the present disclosure, it is assumed that the maximum paging subgroup ID corresponding to the target access network device is 2, the corresponding default paging subgroup ID is also 2, and the paging subgroup ID corresponding to the UE is 1. Due to the fact that the paging subgroup ID of 1 corresponding to UE is smaller than the maximum paging subgroup ID of 2 corresponding to the access network device, the UE can directly use the paging subgroup ID of 1 corresponding to the UE for paging listening.

Furthermore, the specific method of paging listening based on the paging subgroup ID corresponding to the UE in step 603 can be referred to the description of step 203 in the above embodiment, and the details are not repeated in the embodiment of the present disclosure here.

In summary, in the paging indication method provided by the embodiment of the present disclosure, the UE can obtain the paging group configuration information indicated by the access network device. The paging group configuration information includes the default paging subgroup ID and the maximum paging subgroup ID. Next, the UE can perform paging listening based on the default paging subgroup ID and the maximum paging subgroup ID. Specifically, when the paging subgroup ID corresponding to the UE is greater than the maximum paging subgroup ID, then the UE performs paging listening based on the default paging subgroup ID; otherwise the UE performs paging listening based on the paging subgroup ID corresponding to the UE. That is to say, in the embodiment of the present disclosure, when the UE switches to the target cell, the UE can determine the paging subgroup for paging listening based on the default paging subgroup ID and the maximum paging subgroup ID corresponding to the target access network device managing the target cell, and can perform paging listening based on the determined paging subgroup. Therefore, the paging indication method provided by the embodiment of the present disclosure can ensure that the UE can perform paging listening normally when cell reselection occurs, enabling the UE to achieve paging listening matching with different access network devices.

Figure 9:
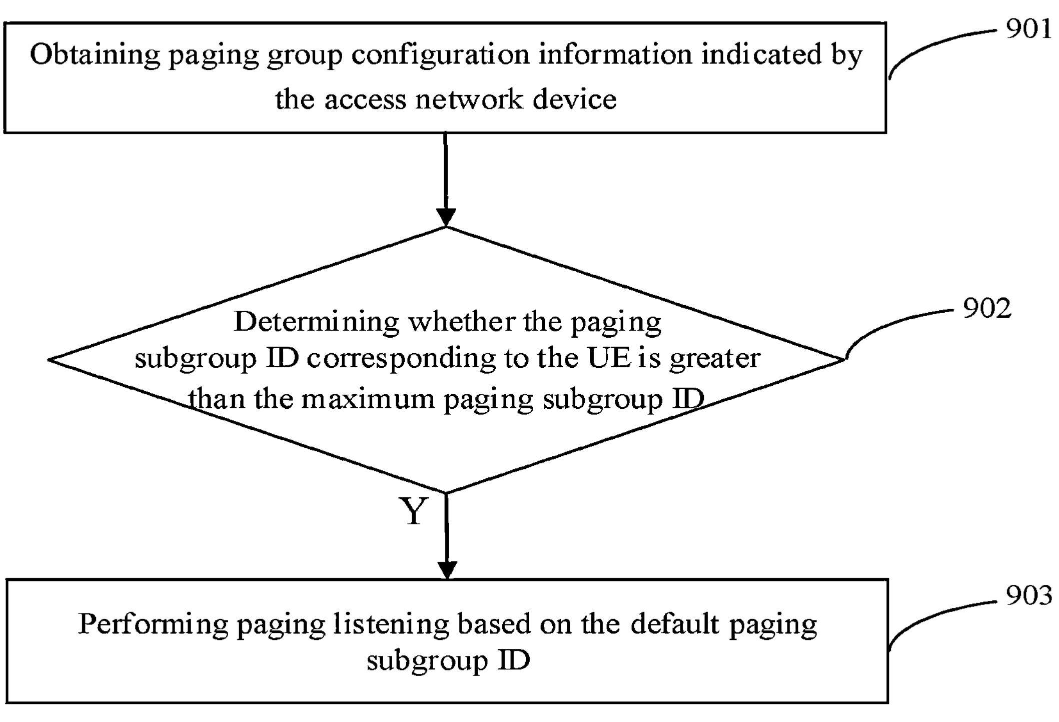
FIG. 9 is a flowchart of a paging indication method provided by another embodiment of the present disclosure.

FIG. 9 is a flowchart of a paging indication method provided by another embodiment of the present disclosure, applied to UE. As shown in FIG. 9, the paging indication method may include the following steps.

Step 901: obtaining paging group configuration information indicated by the access network device. The paging group configuration information can include the default paging subgroup ID and the maximum paging subgroup ID, where the default paging subgroup ID can be the ID of any of the paging groups corresponding to the access network device.

Step 902: determining whether the paging subgroup ID corresponding to the UE is greater than the maximum paging subgroup ID.

Step 903: performing paging listening based on the default paging subgroup ID.

For a detailed description of steps 901 to 903, please refer to the embodiments corresponding to FIG. 5 mentioned above, and the details are not repeated in the embodiment of the present disclosure here.

In summary, in the paging indication method provided by the embodiment of the present disclosure, the UE can obtain the paging group configuration information indicated by the access network device. The paging group configuration information includes the default paging subgroup ID and the maximum paging subgroup ID. Next, the UE can perform paging listening based on the default paging subgroup ID and the maximum paging subgroup ID. Specifically, when the paging subgroup ID corresponding to the UE is greater than the maximum paging subgroup ID, then the UE performs paging listening based on the default paging subgroup ID; otherwise the UE performs paging listening based on the paging subgroup ID corresponding to the UE. That is to say, in the embodiment of the present disclosure, when the UE switches to the target cell, the UE can determine the paging subgroup for paging listening based on the default paging subgroup ID and the maximum paging subgroup ID corresponding to the target access network device managing the target cell, and can perform paging listening based on the determined paging subgroup. Therefore, the paging indication method provided by the embodiment of the present disclosure can ensure that the UE can perform paging listening normally when cell reselection occurs, enabling the UE to achieve paging listening matching with different access network devices.

Figure 10:
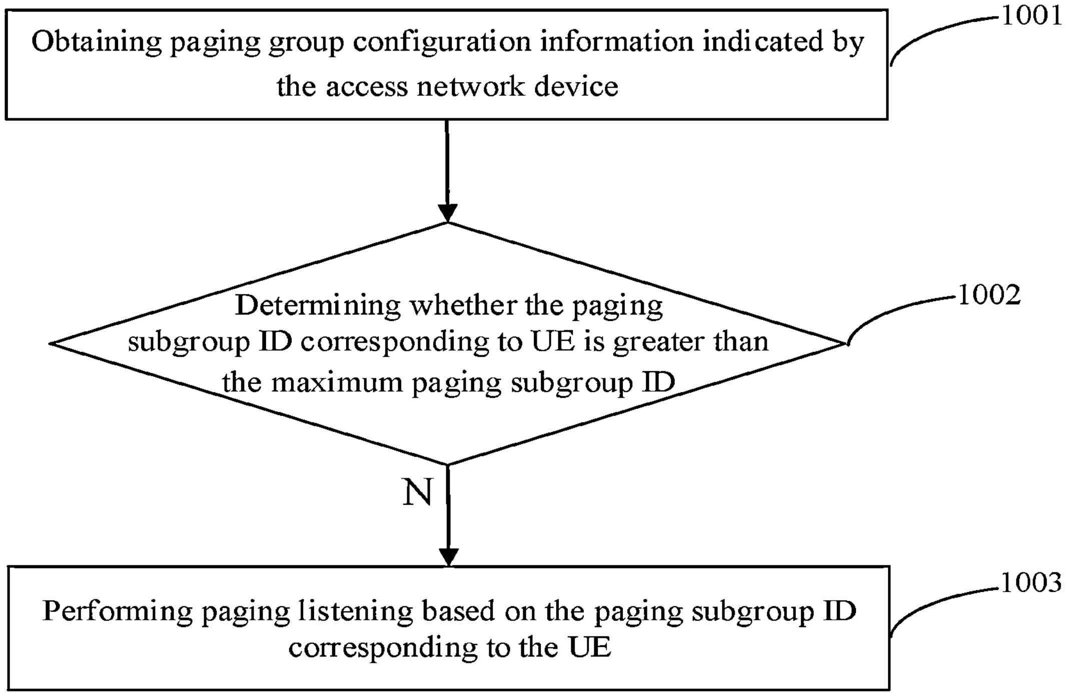
FIG. 10 is a flowchart of a paging indication method provided by another embodiment of the present disclosure.

FIG. 10 is a flowchart of a paging indication method provided by another embodiment of the present disclosure, applied to UE. As shown in FIG. 10, the paging indication method may include the following steps.

Step 1001: obtaining paging group configuration information indicated by the access network device. The paging group configuration information can include the default paging subgroup ID and the maximum paging subgroup ID, where the default paging subgroup ID can be the ID of any of the paging groups corresponding to the access network device.

Step 1002: determining whether the paging subgroup ID corresponding to UE is greater than the maximum paging subgroup ID.

Step 1003: performing paging listening based on the paging subgroup ID corresponding to the UE.

For a detailed description on steps 1001 to 1003, please refer to the embodiments corresponding to FIG. 5 mentioned above, and the details are not repeated in the embodiment of the present disclosure here.

In summary, in the paging indication method provided by the embodiment of the present disclosure, the UE can obtain the paging group configuration information indicated by the access network device. The paging group configuration information includes the default paging subgroup ID and the maximum paging subgroup ID. Next, the UE can perform paging listening based on the default paging subgroup ID and the maximum paging subgroup ID. Specifically, when the corresponding paging subgroup ID of UE is greater than the maximum paging subgroup ID, then the UE performs paging listening based on the default paging subgroup ID; otherwise the UE performs paging listening based on the paging subgroup ID corresponding to the UE. That is to say, in the embodiment of the present disclosure, when the UE switches to the target cell, the UE can determine the paging subgroup for paging listening based on the default paging subgroup ID and the maximum paging subgroup ID corresponding to the target access network device managing the target cell, and can perform paging listening based on the determined paging subgroup. Therefore, the paging indication method provided by the embodiment of the present disclosure can ensure that the UE can perform paging listening normally when cell reselection occurs, enabling the UE to achieve paging listening matching with different access network devices.

In addition, it should be noted that in an embodiment of the present disclosure, if the UE switches to a target cell and does not receive the paging group configuration information indicated by the target access network device managing the target cell, the UE can perform paging listening according to existing methods. For example, once the UE receives any paging message, it will receive the paging message.

FIG. 11 is a flowchart of a paging indication method provided by another embodiment of the present disclosure, applied to the access network device. As shown in FIG. 11, the paging indication method may include the following steps.

Step 1101, indicating the paging group configuration information of the access network device to the UE. The paging group configuration information can include the default paging subgroup ID, and the default paging subgroup ID is the ID of any of the paging groups corresponding to the access network device.

In an embodiment of the present disclosure, the method of indicating the paging group configuration information of the access network device to the UE may include sending the paging group configuration information of the access network device to the UE through a system message. As an example, in an embodiment of the present disclosure, the access network device can add the paging group configuration information to the PCCH-Config of SIB1, thereby sending the paging group configuration information through the system message.

In another embodiment of the present disclosure, the method of indicating the paging group configuration information of the access network device to the UE may include the access network device indicating the paging group configuration information to the UE based on a protocol provision. As an example, in an embodiment of the present disclosure, the paging group configuration information of the access network device can be agreed based on the TS38.304 protocol.

Furthermore, in an embodiment of the present disclosure, the paging group configuration information may also include the maximum paging subgroup ID corresponding to the access network device, so that the UE can perform paging listening based on the maximum paging subgroup ID and the default paging subgroup ID subsequently.

In another embodiment of the present disclosure, the default paging subgroup ID can be the maximum paging subgroup ID.

In summary, in the paging indication method provided by the embodiment of the present disclosure, the access network device can indicate the paging group configuration information of the access network device to the UE. The paging group configuration information includes the default paging subgroup ID and the maximum paging subgroup ID. When the UE switches to a target cell subsequently, the target access network device can send a paging message to the UE based on the paging subgroup ID assigned to the UE by the original access network device corresponding to the original cell before the UE switches the cell as well as the maximum paging subgroup ID in the target access network device. Specifically, when the paging subgroup ID corresponding to the UE is greater than the maximum paging subgroup ID, the target access network device sends a paging message to the UE based on the default paging subgroup ID. Otherwise, a paging message is sent to the UE based on the paging subgroup ID corresponding to the UE. That is to say, in the embodiment of the present disclosure, when the UE switches to the target cell, the target access network device can determine the paging subgroup ID for sending a paging message to the UE based on the default paging subgroup ID and the maximum paging subgroup ID corresponding to the target access network device, as well as the paging subgroup ID assigned to the UE by the original access network device. Therefore, the paging indication method provided by the embodiment of the present disclosure can ensure that the UE can perform paging listening normally when cell reselection occurs, enabling the UE to achieve paging listening matching with different access network devices.

FIG. 12 is a flowchart of a paging indication method provided by another embodiment of the present disclosure, applied to the access network device. As shown in FIG. 12, the paging indication method may include the following steps.

Step 1201: indicating the paging group configuration information of the access network device to the UE. The paging group configuration information can include the default paging subgroup ID, and the default paging subgroup ID is the ID of any of the paging groups corresponding to the access network device.

It should be noted that the detailed description of step 1201 can refer to the description of the previous embodiment, and the details are not repeated in the embodiment of the present disclosure here.

Step 1202: grouping UE and assigning paging subgroup ID to the grouped UE.

It should be noted that in an embodiment of the present disclosure, step 1202 is performed on the premise that the UE supports the paging grouping mechanism.

Step 1203: sending the paging subgroup ID corresponding to the UE through the RRC Release message to the UE when the UE switches to the RRC non-connected state.

Step 1204: sending a paging message to the UE based on the paging subgroup ID corresponding to the UE.

It should be noted that in an embodiment of the present disclosure, sending the paging message to UE based on the paging subgroup ID corresponding to the UE in this step is applied to the scenario of "the access network device referred to in steps 1201-1203 sending a paging message to the UE". That is to say, when the access network device which has assigned a paging subgroup ID to a UE wants to send a paging message to that UE, it can directly send a paging message to the UE based on the paging subgroup ID corresponding to the UE.

For example, in an embodiment of the present disclosure, if base station 1 assigns a paging subgroup ID to a UE, then when base station 1 wants to send a paging message to the UE, it can directly send a paging message to the UE based on the paging subgroup ID corresponding to the UE.

Furthermore, FIG. 13 is a flowchart of a method for sending a paging message to UE based on the paging subgroup ID corresponding to UE in step 1204 provided by an embodiment of the present disclosure. As shown in FIG.

13, the method of sending a paging message to UE based on the paging subgroup ID corresponding to UE can include the following steps.

Step 1301: sending a Paging DCI to the UE, where the Paging DCI can include a first indicator code, and the first indicator code indicates whether the paging subgroup corresponding to the UE needs to receive Paging DCI.

For a detailed description of the first indicator code, please refer to the description in step 301 of the above embodiment, and the details are not repeated in the embodiment of the present disclosure here.

Figure 14:
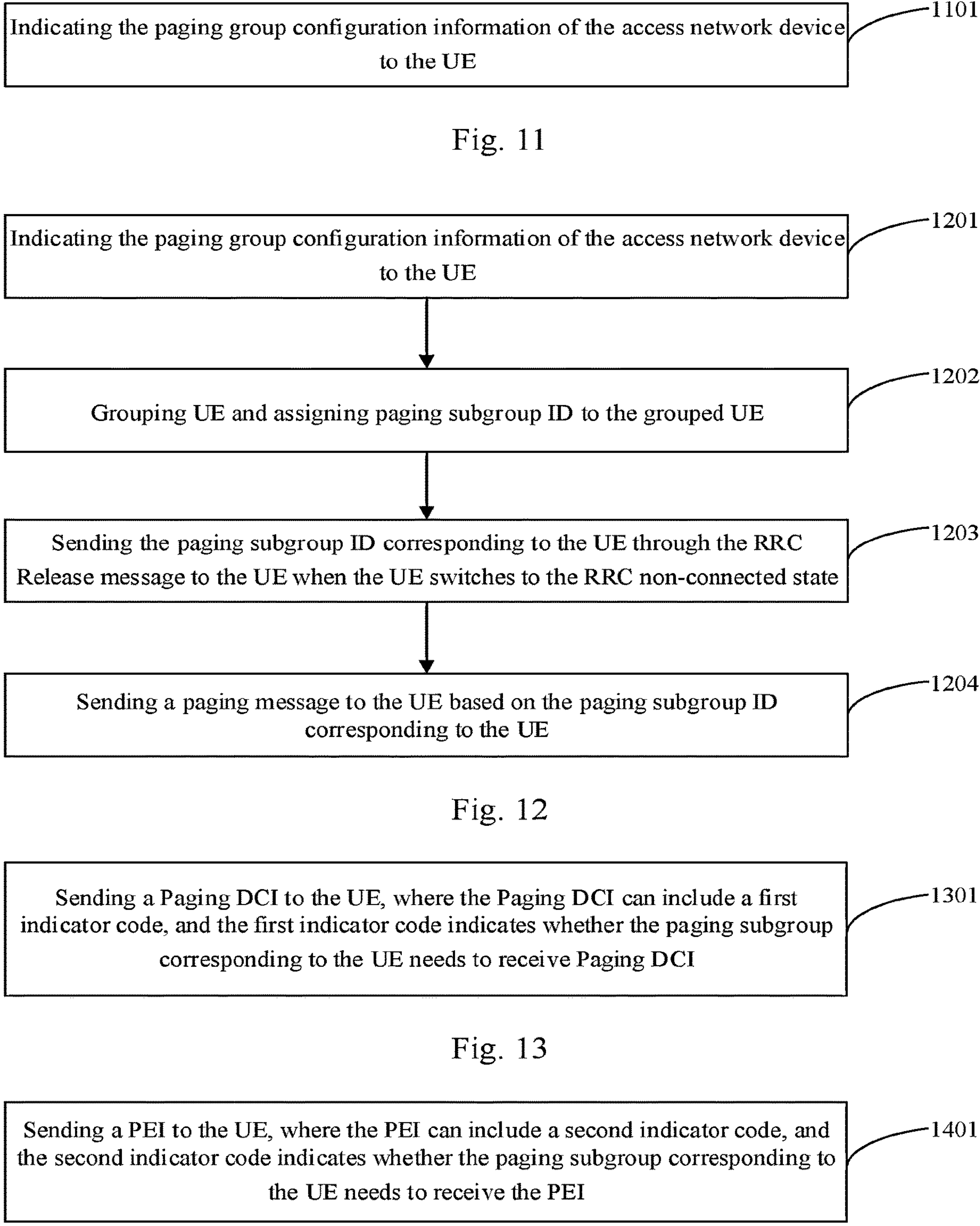
FIG. 14 is a flowchart of another method for sending a paging message to UE based on the corresponding paging subgroup ID of UE provided by an embodiment of the present disclosure.

Also, FIG. 14 is a flowchart of another method for sending a paging message to UE based on the paging subgroup ID corresponding to UE in step 1204 provided by an embodiment of the present disclosure. As shown in FIG. 14, the method of sending a paging message to the UE based on the paging subgroup ID corresponding to the UE can include the following steps.

Step 1401: sending a PEI to the UE, where the PEI can include a second indicator code, and the second indicator code indicates whether the paging subgroup corresponding to the UE needs to receive the PEI.

For a detailed description of the second indicator code, please refer to the description in step 401 of the above embodiment, and the details are not repeated in the embodiment of the present disclosure here.

In summary, in the paging indication method provided by the embodiment of the present disclosure, the access network device can indicate the paging group configuration information of the access network device to the UE. The paging group configuration information includes the default paging subgroup ID and the maximum paging subgroup ID. When the UE switches to a target cell subsequently, the target access network device can send a paging message to the UE based on the paging subgroup ID assigned to the UE by the original access network device corresponding to the original cell before the UE switches the cell as well as the maximum paging subgroup ID in the target access network device. Specifically, when the paging subgroup ID corresponding to the UE is greater than the maximum paging subgroup ID, the target access network device sends a paging message to the UE based on the default paging subgroup ID. Otherwise, a paging message is sent to the UE based on the paging subgroup ID corresponding to the UE. That is to say, in the embodiment of the present disclosure, when the UE switches to the target cell, the target access network device can determine the paging subgroup ID for sending a paging message to the UE based on the default paging subgroup ID and the maximum paging subgroup ID corresponding to the target access network device, as well as the paging subgroup ID assigned to the UE by the original access network device. Therefore, the paging indication method provided by the embodiment of the present disclosure can ensure that the UE can perform paging listening normally when cell reselection occurs, enabling the UE to achieve paging listening matching with different access network devices.

Figure 15:
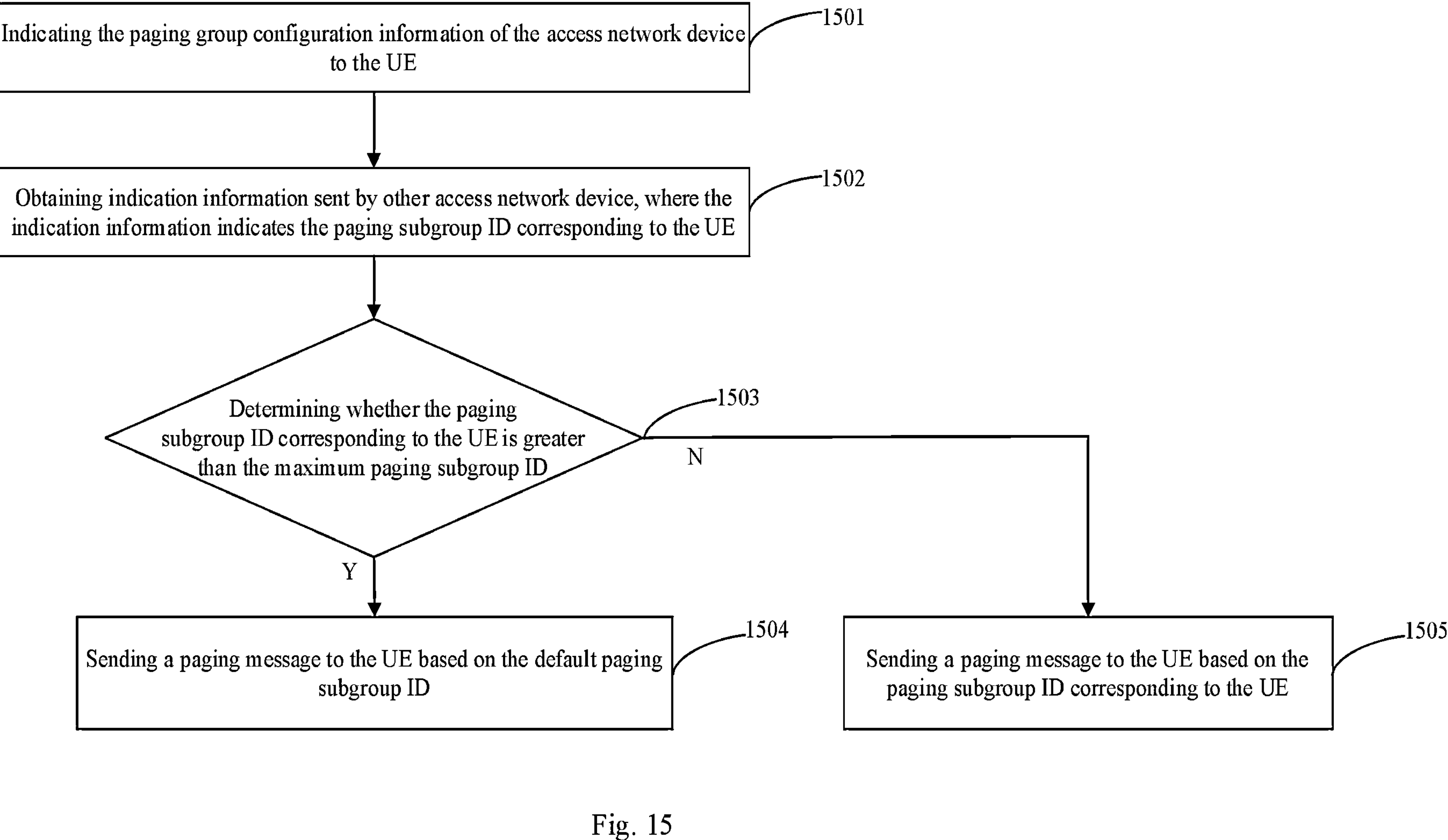
FIG. 15 is a flowchart of a paging indication method provided by another embodiment of the present disclosure.

FIG. 15 is a flowchart of a paging indication method provided by another embodiment of the present disclosure, applied to the access network device. As shown in FIG. 15, the paging indication method may include the following steps.

Step 1501: indicating the paging group configuration information of the access network device to the UE. The paging group configuration information can include the default paging subgroup ID and the maximum paging subgroup ID, where the default paging subgroup ID is the ID of any of the paging groups corresponding to the access network device.

It should be noted that the detailed description of step 1501 can refer to the description of step 1101 in the above embodiments, and the details are not repeated in the embodiment of the present disclosure here.

Step 1502: obtaining indication information sent by other access network device. The indication information indicates the paging subgroup ID corresponding to the UE.

It should be noted that in an embodiment of the present disclosure, other access network device may be the original access network devices corresponding to the original cell before UE switches the cell (such as the access network device referred to in the embodiments corresponding to FIG. 2 or FIG. 12). In this embodiment, the access network device referred to in steps 1501 and 1502 is the target access network device corresponding to the target cell after UE switches the cell.

Furthermore, in an embodiment of the present disclosure, a method for obtaining indication information sent by other access network device may include receiving indication information carried in the paging message sent by other access network device.

Step 1503: determining whether the paging subgroup ID corresponding to the UE is greater than the maximum paging subgroup ID.

In an embodiment of the present disclosure, after the target access network device obtains indication information sent by other access network device, it can be determined whether the paging subgroup ID corresponding to the UE in the original access network device is greater than the maximum paging subgroup ID of the target access network device to determine whether the paging subgroup ID corresponding to the UE matches the paging subgroup corresponding to the UE is greater than the maximum paging subgroup ID, it is considered that the paging subgroup ID corresponding to the UE is not included in the paging subgroup ID corresponding to the target access network device, the two do not match, and step 1504 is performed. When the paging subgroup ID corresponding to the UE is not greater than the maximum paging subgroup ID, it is considered that the paging subgroup ID corresponding to the UE is included in the paging subgroup ID corresponding to the target access network device, the two match, and step 1505 is performed.

Step 1504: sending a paging message to the UE based on the default paging subgroup ID.

FIG. 16 is a flowchart of a method for sending a paging message to UE based on the default paging subgroup ID in step 1504 provided by an embodiment of the present disclosure. As shown in FIG. 16, the method for sending a paging message to the UE based on the default paging subgroup ID can include the following steps.

Step 1601: sending a Paging DCI to UE, where the Paging DCI can include a first indicator code, and the first indicator code indicates whether the paging subgroup corresponding to the default paging subgroup ID needs to receive the Paging DCI.

For a detailed description of the first indicator code, please refer to the description in step 301 of the above embodiment, and the details are not repeated in the embodiment of the present disclosure here.

Also, FIG. 17 is a flowchart of another method for sending a paging message to UE based on a default paging subgroup ID in step 1504 provided by an embodiment of the present disclosure. As shown in FIG. 17, the method for sending a paging message to UE based on the default paging subgroup ID can include the following steps.

Step 1701: sending a PEI to the UE, where the PEI can include a second indicator code, and the second indicator code indicates whether the paging subgroup corresponding to the default paging subgroup ID needs to receive the PEI.

For a detailed description of the second indicator code, please refer to the description in step 401 of the above embodiment, and the details are not repeated in the embodiment of the present disclosure.

Step 1505: sending a paging message to the UE based on the paging subgroup ID corresponding to the UE.

In an embodiment of the present disclosure, when it is determined in step 1503 that the paging subgroup ID corresponding to the UE is not greater than the maximum paging subgroup ID, a paging message can be directly sent to the UE based on the paging subgroup ID corresponding to the UE. The specific method of sending a paging message to the UE based on the paging subgroup ID corresponding to the UE in step 1505 can be referred to the description of step 1204 in the above embodiment, and the details are not repeated in the embodiment of the present disclosure here.

In addition, it should be noted that the indication method provided by steps 1501-1505 above are mainly applicable to RAN paging (Radio Access Network paging) scenarios.

And, as an example, FIG. a is a flowchart illustrating the interaction between the original access network device and the target access network device in a RAN paging scenario provided by an embodiment of the present disclosure.

As shown in FIG. a, gNB1 is the original access network device, with a maximum paging subgroup ID of 4; gNB2 is the target access network device, with a maximum paging subgroup ID of 2 and a default paging subgroup ID of 2. When the UE is in a cell managed by gNB1, gNB1 sends the paging subgroup ID3 corresponding to the UE through an RRC Release message to the UE. In a cell managed by gNB1, gNB1 will send a paging message to the UE through the third paging subgroup. When the UE switches to the cell managed by gNB2, gNB2 will obtain the indication information sent by gNB1 through the paging message, and the indication information indicates that the paging subgroup ID corresponding to the UE is 3. Afterwards, gNB2 determines that the paging subgroup ID of 3 corresponding to the UE is greater than the maximum paging subgroup ID of 2 of gNB2. Then gNB2 sends a paging message to the UE through the default paging subgroup ID of 2, that is, gNB2 sends a paging message to the UE through the second paging subgroup.

In summary, in the paging indication method provided by the embodiment of the present disclosure, the access network device can indicate the paging group configuration information of the access network device to the UE. The paging group configuration information includes the default paging subgroup ID and the maximum paging subgroup ID. When the UE switches to a target cell subsequently, the target access network device can send a paging message to the UE based on the paging subgroup ID assigned to the UE by the original access network device corresponding to the original cell before the UE switches the cell, as well as the maximum paging subgroup ID in the target access network device. Specifically, when the paging subgroup ID corresponding to the UE is greater than the maximum paging subgroup ID, the target access network device sends a paging message to the UE based on the default paging subgroup ID. Otherwise, a paging message is sent to the UE based on the paging subgroup ID corresponding to the UE. That is to say, in the embodiment of the present disclosure, when the UE switches to the target cell, the target access network device can determine the paging subgroup ID for sending a paging message to the UE based on the default paging subgroup ID and the maximum paging subgroup ID corresponding to the target access network device, as well as the paging subgroup ID assigned to the UE by the original access network device. Therefore, the paging indication method provided by the embodiment of the present disclosure can ensure that the UE can perform paging listening normally when cell reselection occurs, enabling the UE to achieve paging listening matching with different access network devices.

Figure 18:
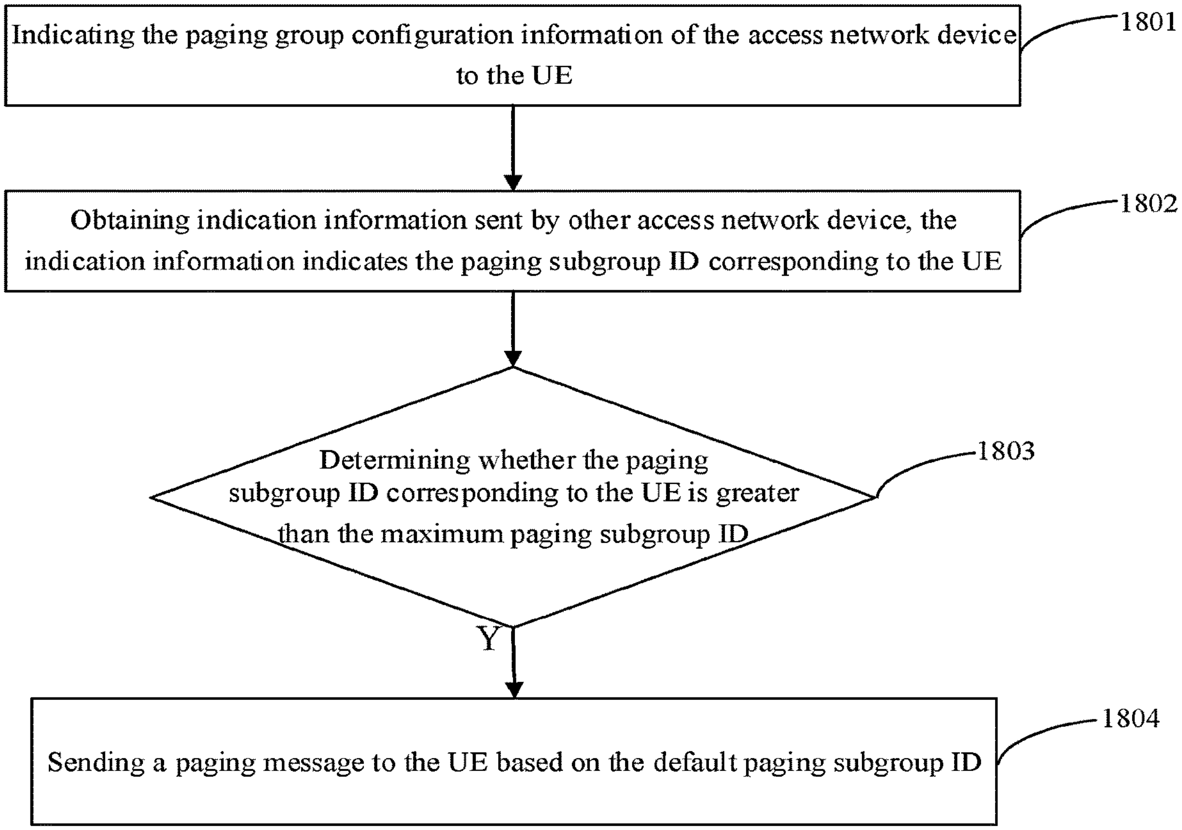
FIG. 18 is a flowchart of a paging indication method provided by another embodiment of the present disclosure.

FIG. 18 is a flowchart of a paging indication method provided by another embodiment of the present disclosure, applied to the access network device. As shown in FIG. 18, the paging indication method may include the following steps.

Step 1801, indicating the paging group configuration information of the access network device to the UE. The paging group configuration information can include the default paging subgroup ID, where the default paging subgroup ID is the ID of any of the paging groups corresponding to the access network device.

Step 1802: obtaining indication information sent by other access network device. The indication information indicates the paging subgroup ID corresponding to the UE.

Step 1803: determining whether the paging subgroup ID corresponding to the UE is greater than the maximum paging subgroup ID.

Step 1804: sending a paging message to the UE based on the default paging subgroup ID.

The detailed description of steps 1801-1804 can refer to the above embodiments, and the details are not repeated in the embodiment of the present disclosure here.

In summary, in the paging indication method provided by the embodiment of the present disclosure, the access network device can indicate the paging group configuration information of the access network device to the UE. The paging group configuration information includes the default paging subgroup ID and the maximum paging subgroup ID. When the UE switches to a target cell subsequently, the target access network device can send a paging message to the UE based on the paging subgroup ID assigned to the UE by the original access network device corresponding to the original cell before the UE switches the cell, as well as the maximum paging subgroup ID in the target access network device. Specifically, when the paging subgroup ID corresponding to the UE is greater than the maximum paging subgroup ID, the target access network device sends a paging message to the UE based on the default paging subgroup ID. Otherwise, a paging message is sent to the UE based on the paging subgroup ID corresponding to the UE. That is to say, in the embodiment of the present disclosure, when the UE switches to the target cell, the target access network device can determine the paging subgroup ID for sending a paging message to the UE based on the default paging subgroup ID and the maximum paging subgroup ID corresponding to the target access network device, as well as the paging subgroup ID assigned to the UE by the original access network device. Therefore, the paging indication method provided by the embodiment of the present disclosure can ensure that the UE can perform paging listening normally when cell reselection occurs, enabling the UE to achieve paging listening matching with different access network devices.

Figure 19:
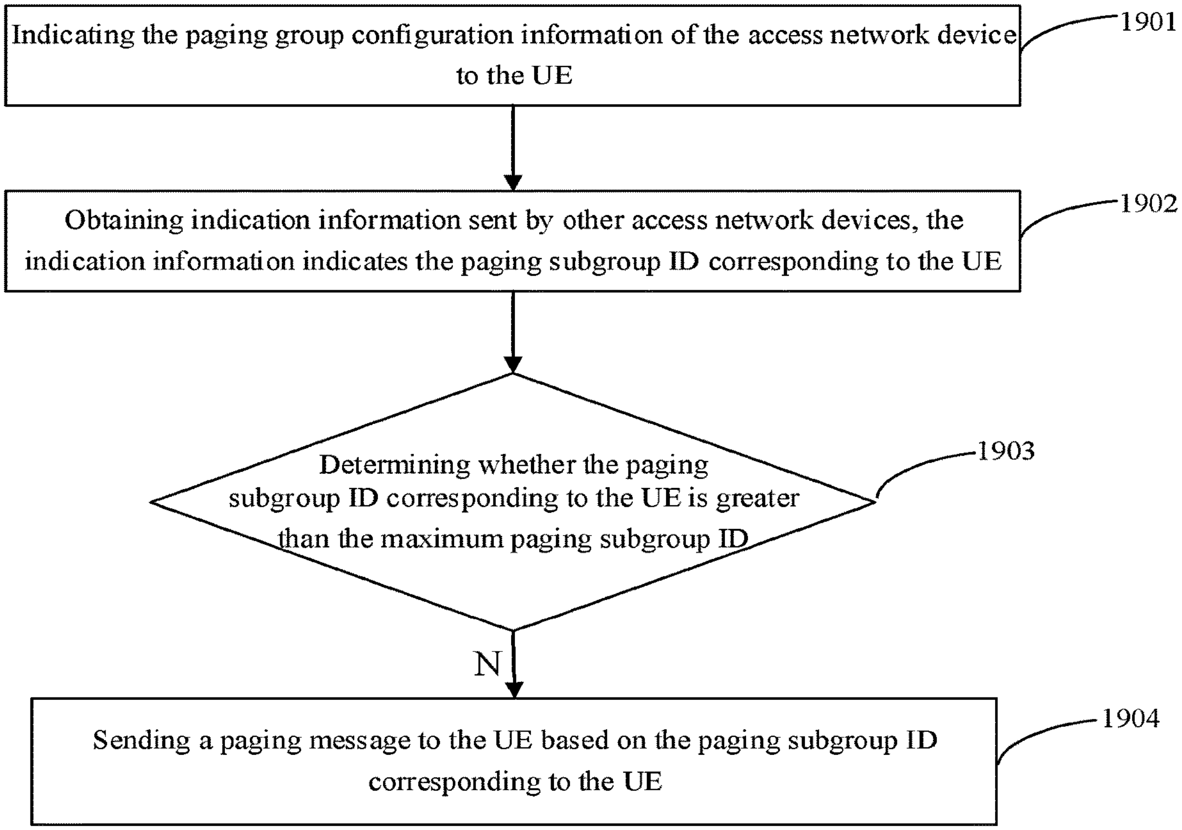
FIG. 19 is a flowchart of a paging indication method provided by another embodiment of the present disclosure.

FIG. 19 is a flowchart of a paging indication method provided by another embodiment of the present disclosure, applied to the access network device. As shown in FIG. 19, the paging indication method may include the following steps.

Step 1901, indicating the paging group configuration information of the access network device to the UE. The paging group configuration information can include the default paging subgroup ID and the maximum paging subgroup ID, where the default paging subgroup ID is the ID of any of the paging groups corresponding to the access network device.

Step 1902: obtaining indication information sent by other access network devices. The indication information indicates the paging subgroup ID corresponding to the UE.

Step 1903: determining whether the paging subgroup ID corresponding to the UE is greater than the maximum paging subgroup ID.

Step 1904: sending a paging message to the UE based on the paging subgroup ID corresponding to the UE.

The detailed description of steps 1901-1904 can refer to the above embodiments, and the details are not repeated in the embodiment of the present disclosure here.

In summary, in the paging indication method provided by the embodiment of the present disclosure, the access network device can indicate the paging group configuration information of the access network device to the UE. The paging group configuration information includes the default paging subgroup ID and the maximum paging subgroup ID. When the UE switches to the target cell subsequently, the target access network device can send a paging message to the UE based on the paging subgroup ID assigned to the UE by the original access network device corresponding to the original cell before the UE switches the cell, as well as the maximum paging subgroup ID in the target access network device. Specifically, when the paging subgroup ID corresponding to the UE is greater than the maximum paging subgroup ID, the target access network device sends a paging message to the UE based on the default paging subgroup ID. Otherwise, a paging message is sent to the UE based on the paging subgroup ID corresponding to the UE. That is to say, in the embodiment of the present disclosure, when the UE switches to the target cell, the target access network device can determine the paging subgroup ID for sending a paging message to the UE based on the default paging subgroup ID and the maximum paging subgroup ID corresponding to the target access network device, as well as the paging subgroup ID assigned to the UE by the original access network device. Therefore, the paging indication method provided by the embodiment of the present disclosure can ensure that the UE can perform paging listening normally when cell reselection occurs, enabling the UE to achieve paging listening matching with different access network devices.

Figure 20A:
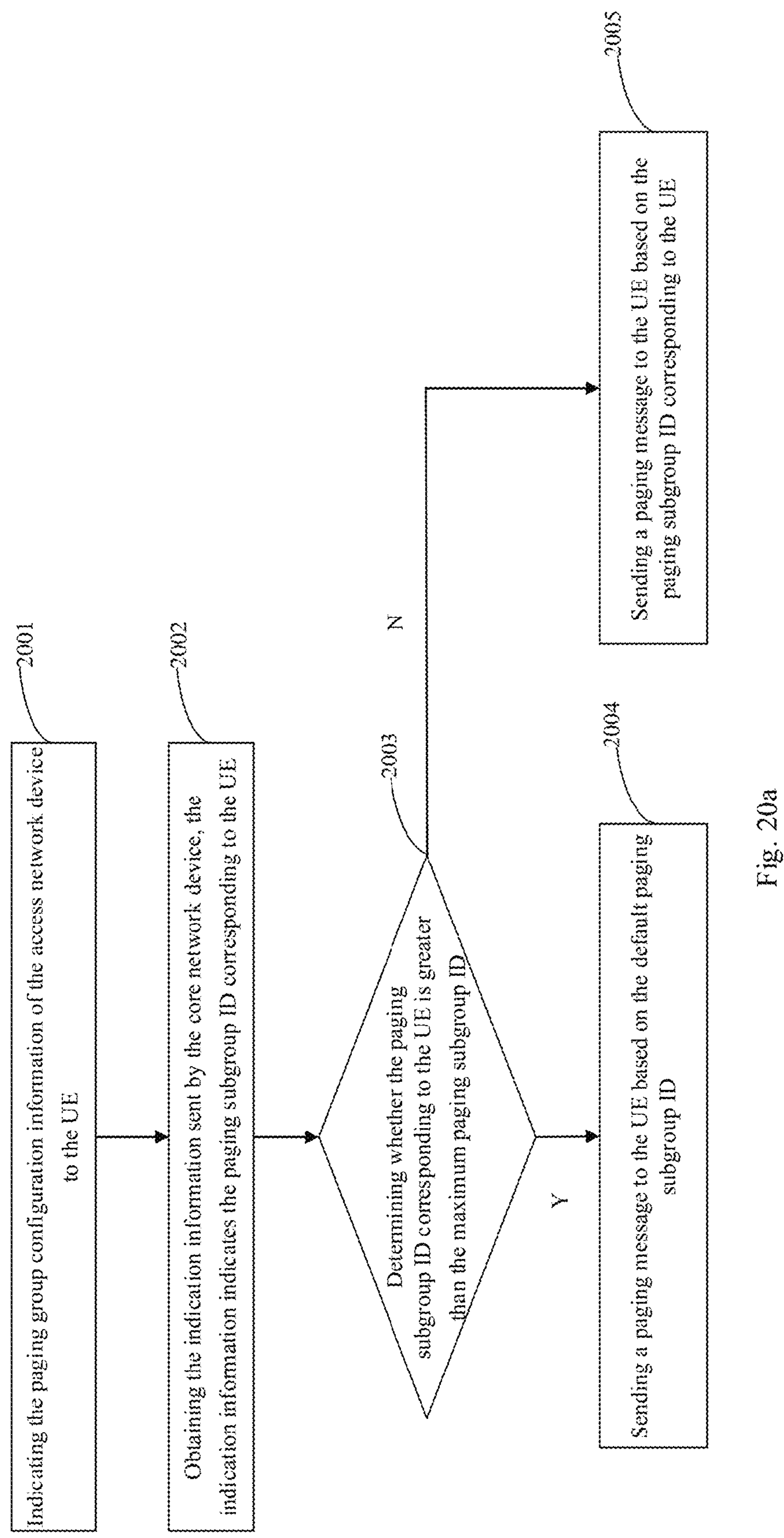
FIG. 20*a* is a flowchart of a paging indication method provided by another embodiment of the present disclosure.
Figure 20B:
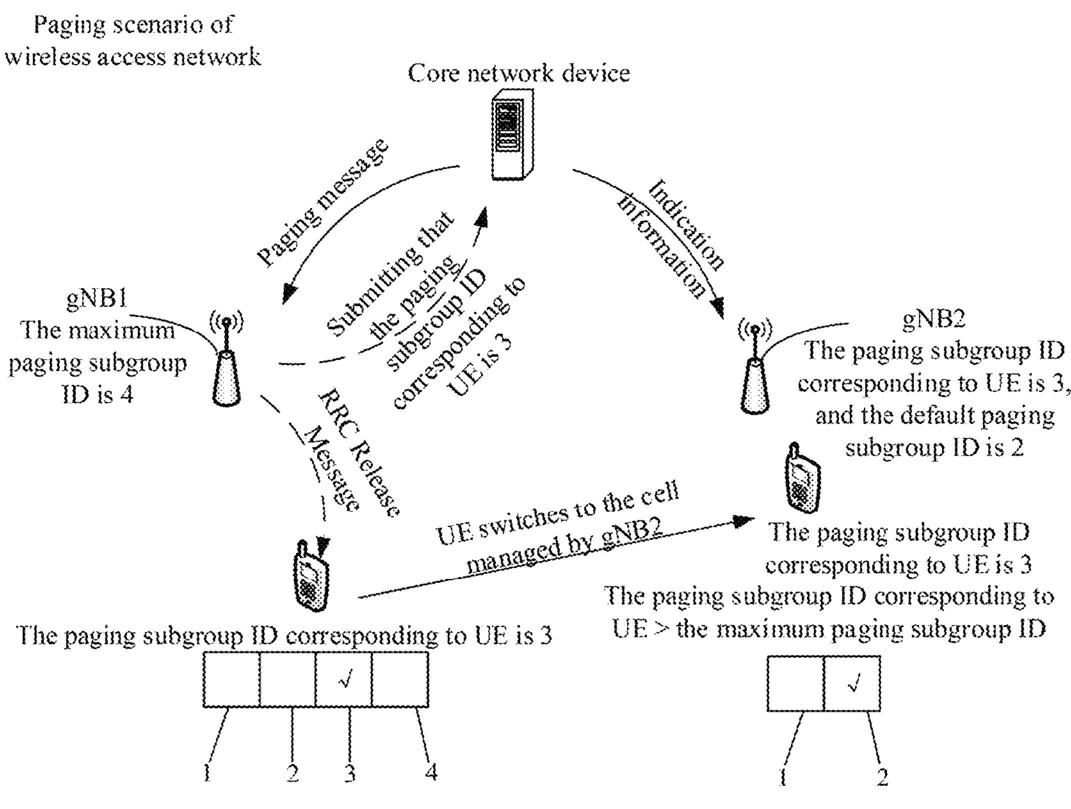
FIG. 20*b* is a flowchart illustrating the interaction between core network device and target access network device in a CN paging scenario provided by an embodiment of the present disclosure.

FIG. 20 is a flowchart of a paging indication method provided by another embodiment of the present disclosure, applied to the access network device. As shown in FIG. 20, the paging indication method may include the following steps.

Step 2001: indicating the paging group configuration information of the access network device to the UE. The paging group configuration information can include the default paging subgroup ID and the maximum paging subgroup ID, where the default paging subgroup ID is the ID of any of the paging groups corresponding to the access network device.

It should be noted that the detailed description of step 2001 can refer to the description of step 1101 in the above embodiment, and the details are not repeated in the embodiment of the present disclosure here.

The access network device referred to in this step 2001 mainly refers to the target access network device corresponding to the target cell after UE switches the cell.

Step 2002: obtaining the indication information sent by the core network device. The indication information indicates the paging subgroup ID corresponding to the UE.

In an embodiment of the present disclosure, the method of obtaining indication information sent by the core network device may include receiving indication information carried in the paging message sent by the core network device.

Furthermore, it should be noted that in an embodiment of the present disclosure, the paging subgroup ID corresponding to the UE obtained by the core network device is reported to the core network device by the original access network device (such as the original access network device in FIG. 2 or FIG. 12).

Step 2003: determining whether the paging subgroup ID corresponding to the UE is greater than the maximum paging subgroup ID.

In an embodiment of the present disclosure, after the target access network device obtains the indication information sent by the core network device, it can be determined whether the paging subgroup ID corresponding to the UE in the original access network device is greater than the maximum paging subgroup ID of the target access network device to determine whether the paging subgroup ID corresponding to the UE matches the paging subgroup ID corresponding to the target access network device. When the paging subgroup ID corresponding to the UE is greater than the maximum paging subgroup ID, it is considered that the paging subgroup ID corresponding to the UE is not included in the paging subgroup ID corresponding to the target access network device, the two do not match and step 2004 is performed. When the paging subgroup ID corresponding to UE is not greater than the maximum paging subgroup ID, it is considered that the paging subgroup ID corresponding to the UE is included in the paging subgroup ID corresponding to the target access network device, the two match, and step 2005 is performed.

Step 2004: sending a paging message to the UE based on the default paging subgroup ID.

Step 2005: sending a paging message to the UE based on the paging subgroup ID corresponding to the UE.

The detailed description of steps 2004-2005 can refer to the above embodiments, and the details are not repeated in the embodiment of the present disclosure here.

In addition, it should be noted that the indication method provided by steps 2001-2005 above is mainly applicable to CN paging (Core Network Paging) scenarios.

And, as an example, FIG. b is a flowchart illustrating the interaction between core network device and target access network device in a CN paging scenario provided by an embodiment of the present disclosure.

As shown in FIG. b, gNB1 is the original access network device, with a maximum paging subgroup ID of 4; gNB2 is the target access network device, with a maximum paging subgroup ID of 2 and a default paging subgroup ID of 2. When the UE is in a cell managed by gNB1, gNB1 sends the paging subgroup ID3 corresponding to the UE through an RRC Release message to the UE. In the cell managed by gNB1, gNB1 will send a paging message to the UE through the third paging subgroup. When UE switches to a cell managed by gNB2, gNB2 will obtain the indication information sent by the core network device through the paging message, and the indication information indicates that the paging subgroup ID corresponding to the UE is 3. Afterwards, gNB2 determines that the paging subgroup ID of 3 corresponding to the UE is greater than the maximum paging subgroup ID of 2 of gNB2. Then gNB2 sends a paging message to the UE through the default paging subgroup ID of 2, that is, gNB2 sends a paging message to the UE through the second paging subgroup.

In summary, in the paging indication method provided by the embodiment of the present disclosure, the access network device can indicate the paging group configuration information of the access network device to the UE. The paging group configuration information includes the default paging subgroup ID and the maximum paging subgroup ID. When the UE switches to the target cell subsequently, the target access network device can send a paging message to the UE based on the paging subgroup ID assigned to the UE by the original access network device corresponding to the original cell before the UE switches the cell, as well as the maximum paging subgroup ID in the target access network device. Specifically, when the paging subgroup ID corresponding to the UE is greater than the maximum paging subgroup ID, the target access network device sends a paging message to the UE based on the default paging subgroup ID. Otherwise, a paging message is sent to the UE based on the paging subgroup ID corresponding to the UE. That is to say, in the embodiment of the present disclosure, when the UE switches to the target cell, the target access network device can determine the paging subgroup ID for sending a paging message to the UE based on the default paging subgroup ID and the maximum paging subgroup ID corresponding to the target access network device, as well as the paging subgroup ID assigned to the UE by the original access network device. Therefore, the paging indication method provided by the embodiment of the present disclosure can ensure that the UE can perform paging listening normally when cell reselection occurs, enabling the UE to achieve paging listening matching with different access network devices.

Figure 21:
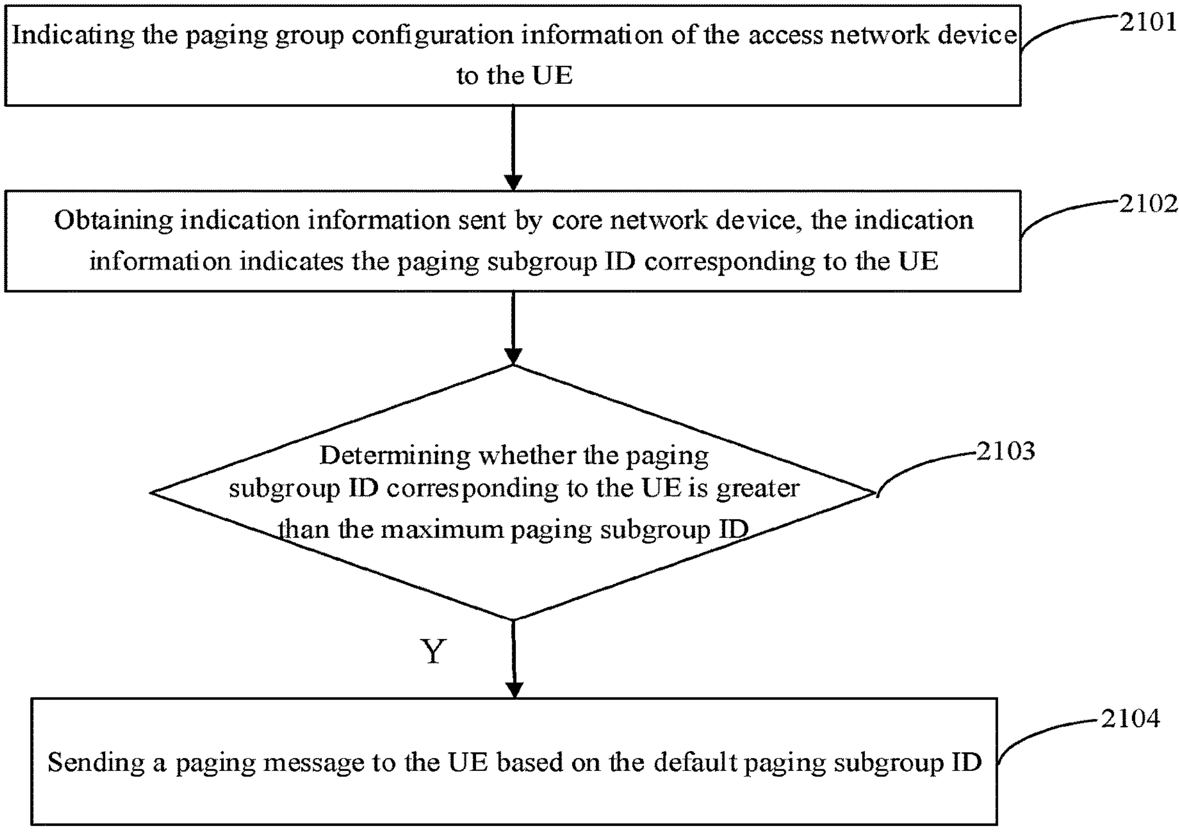
FIG. 21 is a flowchart of a paging indication method provided by another embodiment of the present disclosure.

FIG. 21 is a flowchart of a paging indication method provided by another embodiment of the present disclosure, applied to the access network device. As shown in FIG. 21, The paging indication method may include the following steps.

Step 2101, indicating the paging group configuration information of the access network device to the UE. The paging group configuration information can include the default paging subgroup ID, where the default paging subgroup ID is the ID of any of the paging groups corresponding to the access network device.

Step 2102: obtaining indication information sent by a core network device. The indication information indicates the paging subgroup ID corresponding to the UE.

Step 2103: determining whether the paging subgroup ID corresponding to the UE is greater than the maximum paging subgroup ID.

Step 2104: sending a paging message to the UE based on the default paging subgroup ID.

The detailed description of steps 2101 to 2104 can refer to the above embodiments, and the details are not repeated in the embodiment of the present disclosure here.

In summary, in the paging indication method provided by the embodiment of the present disclosure, the access network device can indicate the paging group configuration information of the access network device to the UE. The paging group configuration information includes the default paging subgroup ID and the maximum paging subgroup ID. When the UE switches to the target cell subsequently, the target access network device can send a paging message to the UE based on the paging subgroup ID assigned to the UE by the original access network device corresponding to the original cell before the UE switches the cell, as well as the maximum paging subgroup ID in the target access network device. Specifically, when the paging subgroup ID corresponding to the UE is greater than the maximum paging subgroup ID, the target access network device sends a paging message to the UE based on the default paging subgroup ID. Otherwise, a paging message is sent to the UE based on the paging subgroup ID corresponding to the UE. That is to say, in the embodiment of the present disclosure, when the UE switches to the target cell, the target access network device can determine the paging subgroup ID for sending a paging message to the UE based on the default paging subgroup ID and the maximum paging subgroup ID corresponding to the target access network device, as well as the paging subgroup ID assigned to the UE by the original access network device. Therefore, the paging indication method provided by the embodiment of the present disclosure can ensure that the UE can perform paging listening normally when cell reselection occurs, enabling the UE to achieve paging listening matching with different access network devices.

Figure 22:
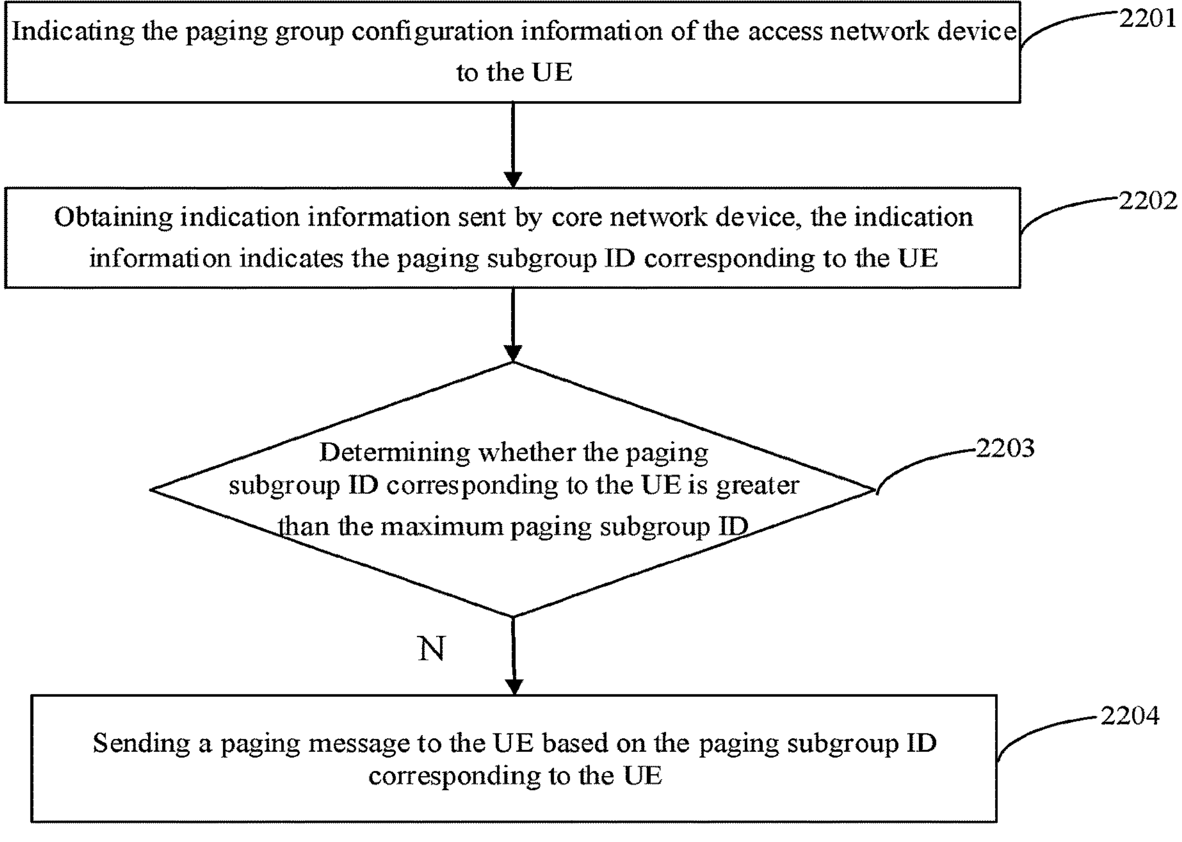
FIG. 22 is a flowchart of a paging indication method provided by another embodiment of the present disclosure.

FIG. 22 is a flowchart of a paging indication method provided by another embodiment of the present disclosure, applied to the access network device. As shown in FIG. 22, the paging indication method may include the following steps.

Step 2201: indicating the paging group configuration information of the access network device to the UE. The paging group configuration information can include the default paging subgroup ID, where the default paging subgroup ID is the ID of any of the paging groups corresponding to the access network device.

Step 2202: obtaining indication information sent by a core network device. The indication information indicates the paging subgroup ID corresponding to the UE.

Step 2203: determining whether the paging subgroup ID corresponding to the UE is greater than the maximum paging subgroup ID.

Step 2204: sending a paging message to the UE based on the paging subgroup ID corresponding to the UE.

The detailed description of steps 2201 to 2204 can refer to the above embodiments, and the details are not repeated in the embodiment of the present disclosure here.

In summary, in the paging indication method provided by the embodiment of the present disclosure, the access network device can indicate the paging group configuration information of the access network device to the UE. The paging group configuration information includes the default paging subgroup ID and the maximum paging subgroup ID. When the UE switches to the target cell subsequently, the target access network device can send a paging message to the UE based on the paging subgroup ID assigned to the UE by the original access network device corresponding to the original cell before the UE switches the cell, as well as the maximum paging subgroup ID in the target access network device. Specifically, when the paging subgroup ID corresponding to the UE is greater than the maximum paging subgroup ID, the target access network device sends a paging message to the UE based on the default paging subgroup ID. Otherwise, a paging message is sent to the UE based on the paging subgroup ID corresponding to the UE. That is to say, in the embodiment of the present disclosure, when the UE switches to the target cell, the target access network device can determine the paging subgroup ID for sending a paging message to the UE based on the default paging subgroup ID and the maximum paging subgroup ID corresponding to the target access network device, as well as the paging subgroup ID assigned to the UE by the original access network device. Therefore, the paging indication method provided by the embodiment of the present disclosure can ensure that the UE can perform paging listening normally when cell reselection occurs, enabling the UE to achieve paging listening matching with different access network devices.

Figure 23:
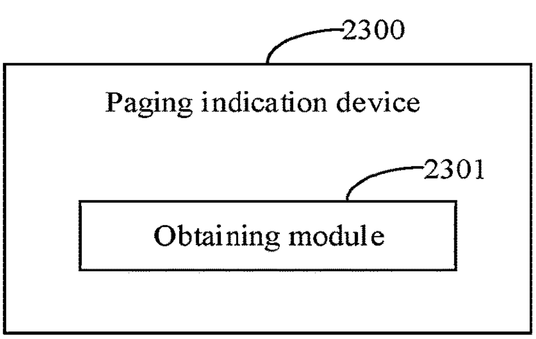
FIG. 23 is a structural schematic diagram of a paging indication device provided by an embodiment of the present disclosure.

FIG. 23 is a structural schematic diagram of a paging indication device provided by an embodiment of the present disclosure. As shown in FIG. 23, the device 2300 can include:

Obtaining module 2301 is configured to obtain paging group configuration information indicated by the access network device. The paging group configuration information includes a default paging subgroup ID, where the default paging subgroup ID is the ID of any of the paging groups corresponding to the access network device.

In summary, in the paging indication device provided by the embodiment of the present disclosure, UE can obtain the paging group configuration information indicated by the access network device. The paging group configuration information includes the default paging subgroup ID and the maximum paging subgroup ID. Next, UE can perform paging listening based on the default paging subgroup ID and the maximum paging subgroup ID. Specifically, when the paging subgroup ID corresponding to UE is greater than the maximum paging subgroup ID, then the UE performs paging listening based on the default paging subgroup ID; otherwise the UE performs paging listening based on the paging subgroup ID corresponding to the UE. That is to say, in the embodiment of the present disclosure, when the UE switches to the target cell, the UE can determine the paging subgroup for paging listening based on the default paging subgroup ID and the maximum paging subgroup ID corresponding to the target access network device managing the target cell, and can perform paging listening based on the determined paging subgroup. Therefore, the paging indication method provided by the embodiment of the present disclosure can ensure that the UE can perform paging listening normally when cell reselection occurs, enabling the UE to achieve paging listening matching with different access network devices.

In an embodiment of the present disclosure, the obtaining module 2301 is further configured to receive the paging group configuration information sent by the access network device through a system message.

Furthermore, in another embodiment of the present disclosure, the obtaining module 2301 is further configured to obtain the paging group configuration information indicated by the access network device based on a protocol provision.

Furthermore, in another embodiment of the present disclosure, the device is also configured to receive the paging subgroup ID corresponding to the UE sent by the access network device through radio resource control RRC release message; and perform paging listening based on the paging subgroup ID corresponding to the UE.

Furthermore, in another embodiment of the present disclosure, the paging group configuration information also includes the maximum paging subgroup ID corresponding to the access network device.

Furthermore, in another embodiment of the present disclosure, the default paging subgroup ID is the maximum paging subgroup ID.

Furthermore, in another embodiment of the present disclosure, the device is also configured to perform paging listening based on the paging group configuration information and the paging subgroup ID corresponding to the UE.

Furthermore, in another embodiment of the present disclosure, the device is also configured to determine whether the paging subgroup ID corresponding to the UE is greater than the maximum paging subgroup ID; when the paging subgroup ID corresponding to the UE is greater than the maximum paging subgroup ID, perform paging listening based on the default paging subgroup ID; and when the paging subgroup ID corresponding to the UE is not greater than the maximum paging subgroup ID, perform paging listening based on the paging subgroup ID corresponding to the UE.

Furthermore, in another embodiment of the present disclosure, the device is also configured to obtain the Paging DCI sent by the access network device, where the Paging DCI includes a first indicator code and the first indicator code indicates whether each paging subgroup needs to receive the Paging DCI; when the first indicator code indicates that the paging subgroup corresponding to the default paging subgroup ID needs to receive the Paging DCI, perform paging listening.

Furthermore, in another embodiment of the present disclosure, the device is also configured to obtain PEI sent by the access network device, where the PEI includes a second indicator code and the second indicator code indicates whether each paging subgroup needs to receive the PEI; when the second indicator code indicates that the paging subgroup corresponding to the default paging subgroup ID needs to receive the PEI, perform paging listening.

Furthermore, in another embodiment of the present disclosure, the device is also configured to obtain Paging DCI sent by the access network device, where the Paging DCI includes a first indicator code, and the first indicator code indicates whether each paging subgroup needs to receive the Paging DCI; when the first indicator code indicates that the paging subgroup corresponding to the UE needs to receive the Paging DCI, perform paging listening.

Furthermore, in another embodiment of the present disclosure, the device is also configured to obtain PEI sent by the access network device, the PEI includes a second indicator code, where the second indicator code indicates whether each paging subgroup needs to receive the PEI; when the second indicator code indicates that the paging subgroup corresponding to the UE needs to receive the PEI, perform paging listening.

Figure 24:
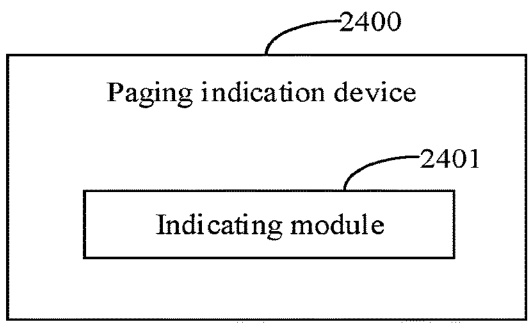
FIG. 24 is a structural schematic diagram of a paging indication device provided by another embodiment of the present disclosure.

FIG. 24 is a structural schematic diagram of a paging indication device provided in another embodiment of the present disclosure, as shown in FIG. 24. The device 2400 can include indicating module 2401 configured to indicate the paging group configuration information of the access network device to the UE. The paging group configuration information includes a default paging subgroup ID, where the default paging subgroup ID is the ID of any paging groups corresponding to the access network device.

In summary, in the paging indication device provided by the embodiment of the present disclosure, the access network device can indicate the paging group configuration information of the access network device to the UE. The paging group configuration information includes the default paging subgroup ID and the maximum paging subgroup ID. When the UE switches to the target cell subsequently, the target access network device can send a paging message to the UE based on the paging subgroup ID assigned to the UE by the original access network device corresponding to the original cell before the UE switches the cell, as well as the maximum paging subgroup ID in the target access network device. Specifically, when the paging subgroup ID corresponding to the UE is greater than the maximum paging subgroup ID, the target access network device sends a paging message to the UE based on the default paging subgroup ID. Otherwise, a paging message is sent to the UE based on the paging subgroup ID corresponding to the UE. That is to say, in the embodiment of the present disclosure, when the UE switches to the target cell, the target access network device can determine the paging subgroup ID for sending a paging message to the UE based on the default paging subgroup ID and the maximum paging subgroup ID corresponding to the target access network device, as well as the paging subgroup ID assigned to the UE by the original access network device. Therefore, the paging indication method provided by the embodiment of the present disclosure can ensure that the UE can perform paging listening normally when cell reselection occurs, enabling the UE to achieve paging listening matching with different access network devices.

In an embodiment of the present disclosure, the indicating module 2401 is further configured to send paging group configuration information to the UE through a system message.

Furthermore, in another embodiment of the present disclosure, the indicating module 2401 is further configured to indicate paging group configuration information to the UE based on a protocol provision.

Furthermore, in another embodiment of the present disclosure, the paging group configuration information also includes the maximum paging subgroup ID corresponding to the access network device.

Furthermore, in another embodiment of the present disclosure, the default paging subgroup ID is the maximum paging subgroup ID.

Furthermore, in another embodiment of the present disclosure, the device is also configured to group UEs and assign paging subgroup IDs to the grouped UEs; when the UE switches to the RRC non-connected state, send the paging subgroup ID corresponding to the UE through the RRC Release message to the UE; and send a paging message to the UE based on the paging subgroup ID corresponding to the UE.

Furthermore, in another embodiment of the present disclosure, the device is also configured to obtain indication information sent by other access network device, where the indication information indicates the paging subgroup ID corresponding to the UE; determine whether the paging subgroup ID corresponding to the UE is greater than the maximum paging subgroup ID; when the paging subgroup ID corresponding to the UE is greater than the maximum paging subgroup ID, send a paging message to the UE based on the default paging subgroup ID; when the paging subgroup ID corresponding to the UE is not greater than the maximum paging subgroup ID, send a paging message to the UE based on the paging subgroup ID corresponding to the UE.

Furthermore, in another embodiment of the present disclosure, the device is also configured to: send Paging DCI to the UE, where the Paging DCI includes a first indicator code and the first indicator code indicates whether the paging subgroup corresponding to the default paging subgroup ID needs to receive the Paging DCI.

Furthermore, in another embodiment of the present disclosure, the device is also configured to send PEI to the UE, where the PEI includes a second indicator code, and the second indicator code indicates whether the paging subgroup corresponding to the default paging subgroup ID needs to receive the PEI.

Furthermore, in another embodiment of the present disclosure, the device is also configured to send Paging DCI to the UE, where the Paging DCI includes a first indicator code, and the first indicator code indicates whether the paging subgroup corresponding to the UE needs to receive the Paging DCI.

Furthermore, in another embodiment of the present disclosure, the device is also configured to send PEI to the UE, where the PEI includes a second indicator code, and the second indicator code indicates whether the paging subgroup corresponding to the UE needs to receive the PEI.

The computer storage medium provided by the embodiment of the present disclosure stores an executable program. After the executable program is executed by the processor, any method shown in FIGS. 1 to 10 or FIGS. 11 to 22 can be implemented.

In order to implement the above embodiments, the present disclosure also proposes a computer program product, including a computer program. When the computer program is executed by a processor, any method shown in FIGS. 1 to 10 or FIGS. 11 to 22 is implemented.

In addition, in order to implement the above embodiments, the present disclosure also proposes a computer program. When the computer program is executed by a processor, any method shown in FIGS. 1 to 10 or FIGS. 11 to 22 is implemented.

Figure 25:
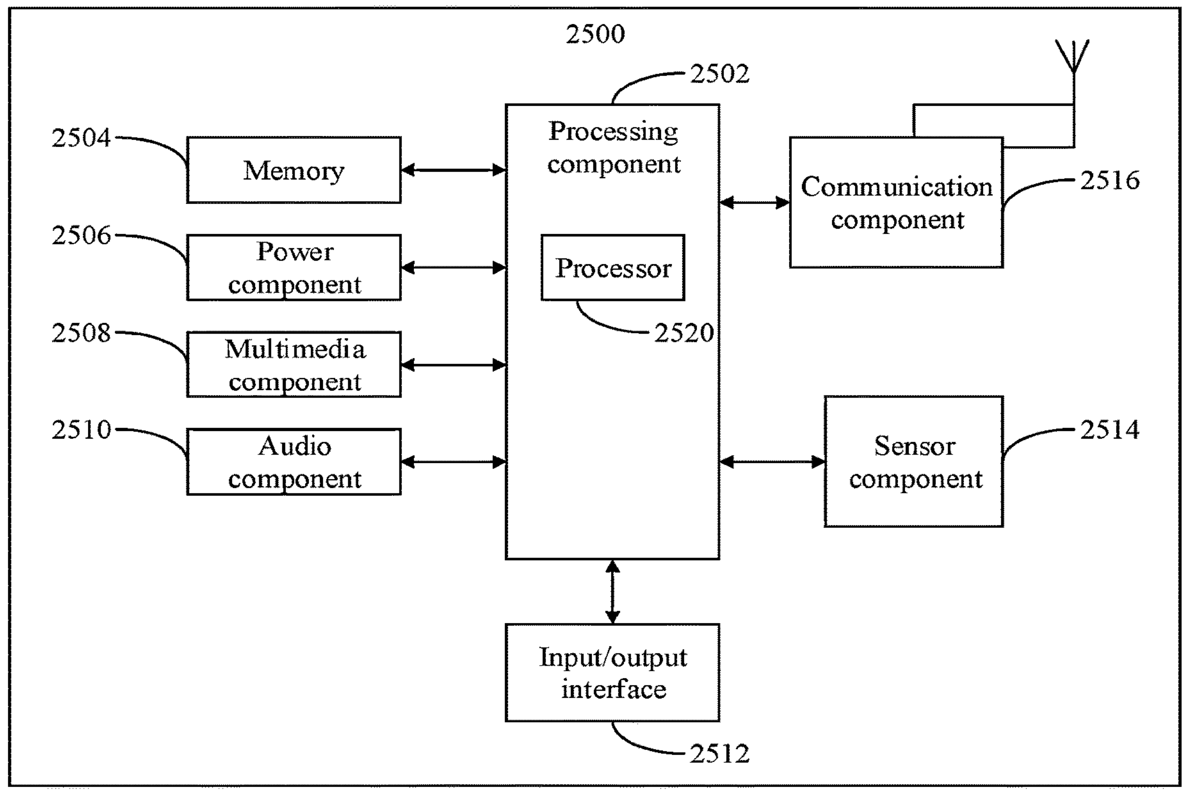
FIG. 25 is a block diagram of a user equipment provided by an embodiment of the present disclosure.

FIG. 25 is a block diagram of user equipment UE 2500 provided by an embodiment of the present disclosure. For example, UE 2500 can be a mobile phone, a computer, a digital broadcasting terminal device, a messaging device, a game console, a tablet device, a medical device, a fitness device, a personal digital assistant, etc.

Referring to FIG. 25, the UE 2500 can include at least one of the following components: a processing component 2502, a memory 2504, a power component 2506, a multimedia component 2508, an audio component 2510, an input/output (I/O) interface 2512, a sensor component 2513, and a communication component 2516.

The processing component 2502 typically controls the overall operation of the UE 2500, such as operations associated with display, telephone calls, data communication, camera operations, and recording operations. The processing component 2502 may include at least one processor 2520 to execute instructions to complete all or part of the steps of the above method. In addition, the processing component 2502 can include at least one module to facilitate interaction between the processing component 2502 and other components. For example, the processing component 2502 may include a multimedia module to facilitate interaction between the multimedia component 2508 and the processing component 2502.

The memory 2504 is configured to store various types of data to support operations on UE 2500. Examples of these data include instructions for any application or method operated on the UE 2500, contact data, phone book data, messages, images, videos, etc. The memory 2504 can be implemented by any type of volatile or non-volatile storage device or a combination of them, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disc.

The power component 2506 provides power to various components of the UE 2500. The power component 2506 can include a power management system, at least one power supply, and other components associated with generating, managing, and distributing power for the UE 2500.

The multimedia component 2508 includes a screen providing an output interface between the UE 2500 and the user. In some embodiments, the screen may include a liquid crystal display (LCD) and a touch panel (TP). If the screen includes a touch panel, the screen can be implemented as a touch screen to receive input signals from the user. The touch panel includes at least one touch sensor to sense touch, sliding, and gestures on the touch panel. The touch sensor can not only sense the boundaries of touch or sliding actions, but also detect wake-up time and pressure related to the touch or sliding operation. In some embodiments, the multimedia component 2508 includes a front camera and/or a rear camera. When the UE 2500 is in operating mode, such as a shooting mode or a video mode, the front camera and/or the rear camera can receive external multimedia data. Each of the front camera and the rear camera can be a fixed optical lens system or have focal length and optical zoom capabilities.

The audio component 2510 is configured to output and/or input audio signals. For example, the audio component 2510 includes a microphone (MIC) configured to receive external audio signals when the UE 2500 is in operating modes such as call mode, recording mode, and speech recognition mode. The received audio signal can be further stored in the memory 2504 or sent through the communication component 2516. In some embodiments, the audio component 2510 also includes a speaker for outputting audio signals.

The I/O interface 2512 provides an interface between the processing component 2502 and peripheral interface modules. The peripheral interface modules can be keyboards, click wheels, buttons, etc. These buttons can include but are not limited to: home button, volume button, start button, and lock button.

The sensor component 2513 includes at least one sensor for providing status evaluation of various aspects for the UE 2500. For example, the sensor component 2513 can detect the open/closed state of the device 2500 and the relative positioning of the components. For example, the components are the display and the keypad of the UE 2500. The sensor component 2513 can also detect changes in the position of one component of the UE 2500 or the UE 2500, the presence or absence of user contact with the UE 2500, the orientation or acceleration/deceleration of the UE 2500, and temperature changes of the UE 2500. The sensor component 2513 can include a proximity sensor configured to detect the presence of nearby objects without any physical contact. The sensor component 2513 can also include optical sensors, such as CMOS or CCD image sensors, for use in imaging applications. In some embodiments, the sensor component 2513 may also include an acceleration sensor, a gyroscope sensor, a magnetic sensor, a pressure sensor, or a temperature sensor.

The communication component 2516 is configured to facilitate wired or wireless communication between the UE 2500 and other devices. The UE 2500 can access wireless network based on communication standards, such as WiFi, 2G, or 3G, or a combination of them. In an exemplary embodiment, the communication component 2516 receives broadcast signals from an external broadcast management system through a broadcast channel or broadcast related information. In an exemplary embodiment, the communication component 2516 further includes a Near Field Communication (NFC) module to facilitate short range communication. For example, the NFC module can be implemented based on radio frequency identification (RFID) technology, infrared data association (IrDA) technology, ultra wideband (UWB) technology, Bluetooth (BT) technology, and other technologies.

In exemplary embodiments, the UE 2500 can be implemented by at least one application specific integrated circuit (ASIC), digital signal processor (DSP), digital signal processing device (DSPD), programmable logic device (PLD), field programmable gate array (FPGA), controller, microcontroller, microprocessor, or other electronic component for executing the above method.

Figure 26:
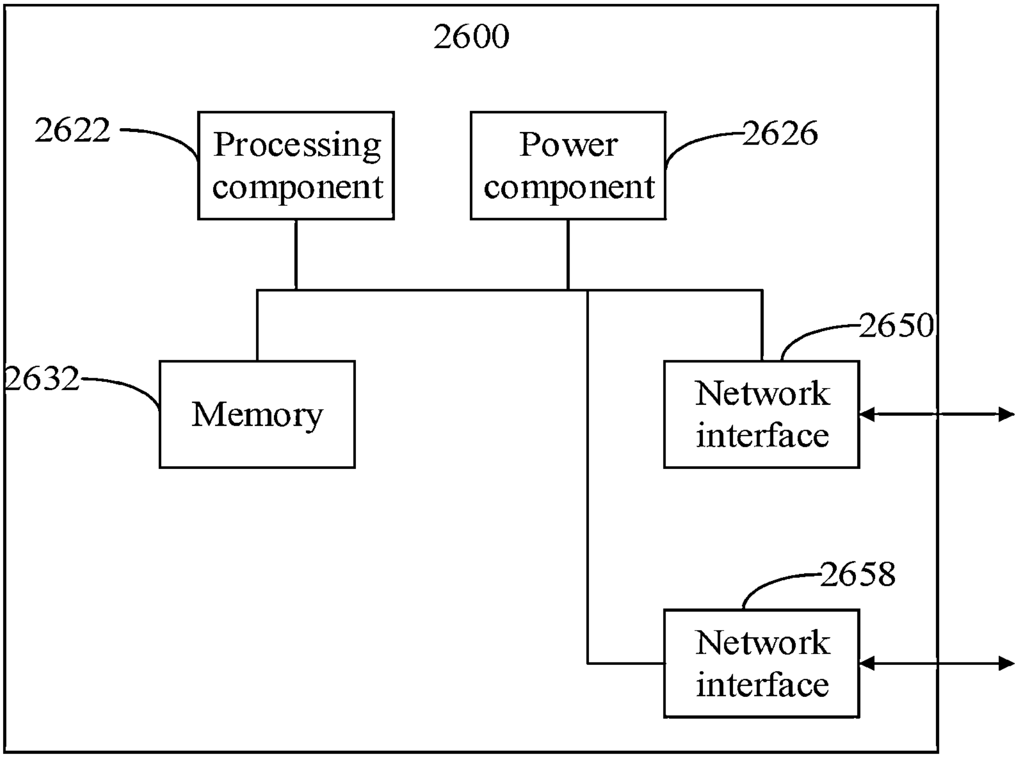
FIG. 26 is a block diagram of an access network device provided by an embodiment of the present disclosure.

FIG. 26 is a block diagram of an access network device 2600 provided by the embodiment of the present application. For example, the access network device 2600 can be provided as an access network device. Referring to FIG. 26, the access network device 2600 includes a processing component 2622, which further includes at least one processor, as well as memory resources represented by a memory 2632, for storing instructions that can be executed by the processing component 2622, such as application programs. The application programs stored in the memory 2632 may include one or more modules corresponding to a set of instructions. In addition, the processing component 2622 is configured to execute instructions to execute any of the aforementioned methods applied to the access network device, such as the method shown in FIG. 1.

The access network device 2600 may also include a power component 2626 configured to perform power management of the access network device 2600; a wired or wireless network interface 2650 configured to connect the access network device 2600 to the network; and an input output (I/O) interface 2658. The access network device 2600 can operate operating systems based on the memory 2632, such as Windows Server™, Mac OS X™, Unix™, Linux™, Free BSD™, or similar.

After considering the specifications and practices of the present disclosure herein, those skilled in the art will easily come up with other implementation solutions of the present disclosure. The present disclosure aims to cover any variations, uses, or adaptive changes of the present disclosure, which follow the general principles of the present disclosure and include common knowledge or commonly used technical means in the technical field that are not disclosed in the present disclosure. The specification and embodiments are only considered exemplary, and the true scope and spirit of this disclosure are indicated by the following claims.

It should be understood that the present disclosure is not limited to the precise structure already described above and shown in the accompanying drawings, and various modifications and changes can be made without departing from its scope. The scope of this disclosure is limited only by the accompanying claims.

What is claimed is:

1. A paging indication method, performed by a user equipment UE, comprising:

obtaining paging group configuration information indicated by an access network device, wherein the paging group configuration information comprises a default paging subgroup serial number ID, and the default paging subgroup ID is an ID of any of paging groups corresponding to the access network device, wherein the paging group configuration information further comprises a maximum paging subgroup ID corresponding to the access network device, wherein the method further comprises:

performing paging listening based on the default paging subgroup ID or a paging subgroup ID corresponding to the UE based on a comparison between the paging subgroup ID corresponding to the UE and the maximum paging subgroup ID.

2. The method as claimed in claim 1, wherein obtaining the paging group configuration information indicated by the access network device comprises:

receiving the paging group configuration information sent by the access network device through a system message; or obtaining the paging group configuration information indicated by the access network device based on a protocol provision.

3. The method as claimed in claim 1, further comprising:

receiving a paging subgroup ID corresponding to the UE sent by the access network device through a radio resource control RRC release message; and performing paging listening based on the paging subgroup ID corresponding to the UE.

4. The method as claimed in claim 3, wherein performing paging listening based on the paging subgroup ID corresponding to the UE, comprises:

obtaining Paging Downlink Control Information DCI sent by the access network device, wherein the Paging DCI comprises a first indicator code, and the first indicator code indicates whether each paging subgroup needs to receive the Paging DCI;

in response to that the first indicator code indicates that a paging subgroup corresponding to the UE needs to receive the Paging DCI, performing paging listening; or obtaining Paging Early Indication PEI sent by the access network device, wherein the PEI comprises a second indicator code, and the second indicator code indicates whether each paging subgroup needs to receive the PEI;

in response to that the second indicator code indicates that the paging subgroup corresponding to the UE needs to receive the PEI, performing paging listening.

5. The method as claimed in claim 1, wherein the default paging subgroup ID is the maximum paging subgroup ID.

6. The method as claimed in claim 1, further comprising:

performing paging listening based on the paging group configuration information and a paging subgroup ID corresponding to the UE.

7. The method as claimed in claim 6, wherein performing paging listening based on the paging group configuration information and the paging subgroup ID corresponding to the UE, comprises:

determining whether the paging subgroup ID corresponding to the UE is greater than the maximum paging subgroup ID;

in response to that the paging subgroup ID corresponding to the UF is greater than the maximum paging subgroup ID, performing paging listening based on the default paging subgroup ID; and in response to that the paging subgroup ID corresponding to the UE is not greater than the maximum paging subgroup ID, performing paging listening based on the paging subgroup ID corresponding to the UE.

8. The method as claimed in claim 7, wherein performing paging listening based on the default paging subgroup ID, comprises:

obtaining Paging Downlink Control Information DCI sent by the access network device, wherein the Paging DCI comprises a first indicator code, and the first indicator code indicates whether each paging subgroup needs to receive the Paging DCI;

in response to that the first indicator code indicates that a paging subgroup corresponding to the default paging subgroup ID needs to receive the Paging DCI, performing paging listening; or obtaining Paging Early Indication PEI sent by the access network device, wherein the PEI comprises a second indicator code, and the second indicator code indicates whether each paging subgroup needs to receive the PEI;

in response to that the second indicator code indicates that a paging subgroup corresponding to the default paging subgroup ID needs to receive the PEI, performing paging listening.

9. The method as claimed in claim 7, wherein performing paging listening based on the paging subgroup ID corresponding to the UE, comprises:

obtaining Paging Downlink Control Information DCI sent by the access network device, wherein the Paging DCI comprises a first indicator code, and the first indicator code indicates whether each paging subgroup needs to receive the Paging DCI;

in response to that the first indicator code indicates that the paging subgroup corresponding to the UE needs to receive the Paging DCI, performing paging listening; or obtaining Paging Early Indication PEI sent by the access network device, wherein the PEI comprises a second indicator code, and the second indicator code indicates whether each paging subgroup needs to receive the PEI;

in response to that the second indicator code indicates that the paging subgroup corresponding to the UE needs to receive the PEI, performing paging listening.

10. A paging indication method, performed by an access network device, comprising:

indicating paging group configuration information of the access network device to a UE, wherein the paging group configuration information comprises a default paging subgroup ID, and the default paging subgroup ID is an ID of any of paging groups corresponding to the access network device, wherein the paging group configuration information further comprises a maximum paging subgroup ID corresponding to the access network device.

wherein the method further comprises:

sending a paging message based on the default paging subgroup ID or a paging subgroup ID corresponding to the UE based on a comparison between the paging subgroup ID corresponding to the UE and the maximum paging subgroup ID.

11. The method as claimed in claim 10, wherein indicating the paging group configuration information of the access network device to the UE, comprises:

sending the paging group configuration information to the UE through a system message; or indicating the paging group configuration information to the UE based on a protocol provision.

12. The method as claimed in claim 10, wherein the default paging subgroup ID is the maximum paging subgroup ID.

13. The method as claimed in claim 10, further comprising:

grouping the UE and assigning a paging subgroup ID to the grouped UE;

in response to that the UE switches to an RRC non-connected state, sending the paging subgroup ID corresponding to the UE through an RRC Release message to the UE; and sending a paging message to the UE based on the paging subgroup ID corresponding to the UE.

14. The method as claimed in claim 13, wherein sending the paging message to the UE based on the paging subgroup ID corresponding to the UE, comprises:

sending Paging Downlink Control Information DCI to the UE, wherein the Paging DCI comprises a first indicator code, and the first indicator code indicates whether a paging subgroup corresponding the UE needs to receive the Paging DCI; or sending Paging Early Indication PEI to the UE, wherein the PEI comprises a second indicator code, and the second indicator code indicates whether the paging subgroup corresponding to the UE needs to receive the PEI.

15. The method as claimed in claim 10, further comprising:

obtaining indication information sent by another access network device or a core network device, wherein the indication information indicates a paging subgroup ID corresponding to the UE;

determining whether the paging subgroup ID corresponding to the UE is greater than the maximum paging subgroup ID;

in response to that the paging subgroup ID corresponding to the UE is greater than the maximum paging subgroup ID, sending a paging message to the UE based on the default paging subgroup ID; and in response to that the paging subgroup ID corresponding to the UE is not greater than the maximum paging subgroup ID, sending a paging message to the UE based on the paging subgroup ID corresponding to the UE.

16. The method according to claim 15, wherein sending the paging message to the UE based on the default paging subgroup ID, comprises:

sending Paging Downlink Control Information DCI to the UE, wherein the Paging DCI comprises a first indicator code, and the first indicator code indicates whether a paging subgroup corresponding to the default paging subgroup ID needs to receive the Paging DCI; or sending Paging Early Indication PEI to the UE, wherein the PEI comprises a second indicator code, and the second indicator code indicates whether a paging subgroup corresponding to the default paging subgroup ID needs to receive the PEI.

17. An access network device, comprising: a transceiver; a memory; a processor, respectively connected to the transceiver and the memory, configured to control wireless signal transmission and reception of the transceiver by executing computer executable instructions on the memory, and capable of implementing the method as claimed in claim 10.

18. A user equipment, comprising: a transceiver; a memory; a processor, respectively connected to the transceiver and the memory, configured to control wireless signal transmission and reception of the transceiver by executing computer executable instructions on the memory, and capable of implementing the following process:

obtaining paging group configuration information indicated by an access network device, wherein the paging group configuration information comprises a default paging subgroup serial number ID, and the default paging subgroup ID is an ID of any of paging groups corresponding to the access network device, wherein the paging group configuration information further comprises a maximum paging subgroup ID corresponding to the access network device, wherein the processor is capable of implementing the following process:

performing paging listening based on the default paging subgroup ID or a paging subgroup ID corresponding to the UE based on a comparison between the paging subgroup ID corresponding to the UE and the maximum paging subgroup ID.

* * * * *